US012770023B2

(12) United States Patent
Ezrielev et al.

(10) Patent No.: US 12,770,023 B2
(45) Date of Patent: Oct. 20, 2026

(54) SYSTEM AND METHOD FOR IDENTIFYING INPUT FEATURES CONTRIBUTING TO LATENT BIAS IN INFERENCE MODELS

(71) Applicant: Dell Products L.P., Round Rock, TX (US)

(72) Inventors: Ofir Ezrielev, Be'er Sheva (IL); Tomer Kushnir, Omer (IL); Fatemeh Azmandian, Raynham, MA (US)

(73) Assignee: Dell Products L.P., Round Rock, TX (US)

( * ) Notice: Subject to any disclaimer, the term of this patent is extended or adjusted under 35 U.S.C. 154(b) by 921 days.

(21) Appl. No.: 18/160,595

(22) Filed: Jan. 27, 2023

(65) Prior Publication Data

US 2024/0256914 A1 Aug. 1, 2024

(51) Int. Cl.
*G06N 5/022* (2023.01)
*G06N 5/04* (2023.01)

(52) U.S. Cl.
CPC ............... *G06N 5/022* (2013.01); *G06N 5/04* (2013.01)

(58) Field of Classification Search
CPC ................................ G06N 5/022; G06N 5/04
See application file for complete search history.

(56) References Cited

U.S. PATENT DOCUMENTS

| | | | |
|---|---|---|---|
| 10,831,339 | B2 | 11/2020 | Gauci |
| 11,256,989 | B2 | 2/2022 | Dalli |
| 11,881,311 | B1 | 1/2024 | Fortney |
| 2017/0068408 | A1 | 3/2017 | Gauci |

(Continued)

FOREIGN PATENT DOCUMENTS

| | | | |
|---|---|---|---|
| CN | 110516541 | A | 11/2019 |
| CN | 114463063 | A | 5/2022 |

(Continued)

OTHER PUBLICATIONS

Kang, et al. "Neurosurgeon: Collaborative intelligence between the cloud and mobile edge." ACM SIGARCH Computer Architecture News 45.1 (2017): 615-629. (15 pages).

(Continued)

*Primary Examiner* — Matthew Ell
*Assistant Examiner* — David Kim
(74) *Attorney, Agent, or Firm* — WOMBLE BOND DICKINSON (US) LLP

(57) ABSTRACT

Methods, systems, and devices for providing computer-implemented services are disclosed. To provide the computer-implemented services, inference models used by data processing systems may be managed to reduce the likelihood of the inference models providing inferences indicative of bias features. The inference models may be managed by identifying input features in the training data set used to train the inference models with a high contribution to latent bias exhibited by the inference models. The input features may be removed from the training data set and a new inference model may be trained using the remainder of the input features. The new inference model may replace the inference model and, therefore, the inferences provided by the new inference model may be less likely to include latent bias thereby reducing bias in computer-implemented services provided using the inferences.

20 Claims, 12 Drawing Sheets

(56) References Cited

U.S. PATENT DOCUMENTS

| | | | | |
|---|---|---|---|---|
| 2021/0004700 | A1 | 1/2021 | Prabhu | |
| 2022/0114399 | A1* | 4/2022 | Castiglione ............ | G06N 3/045 |
| 2022/0198297 | A1 | 6/2022 | Ganguly | |
| 2022/0391683 | A1 | 12/2022 | Cmielowski | |
| 2023/0104662 | A1 | 4/2023 | Fatemi | |
| 2024/0037427 | A1 | 2/2024 | Sharpe | |
| 2024/0104422 | A1* | 3/2024 | Zhou ...................... | G16H 50/20 |
| 2024/0135238 | A1 | 4/2024 | Sattigeri | |
| 2024/0369662 | A1 | 11/2024 | Francavilla | |

FOREIGN PATENT DOCUMENTS

| | | | |
|---|---|---|---|
| CN | 114998676 | A | 9/2022 |
| WO | 2022240860 | A1 | 11/2022 |

OTHER PUBLICATIONS

Zheng, X., et al. "Neural architecture search with representation mutual information." Proceedings of the IEEE/CVF conference on computer vision and pattern recognition. 2022. (10 pages).

Chu, et al. "Fairnas: Rethinking evaluation fairness of weight sharing neural architecture search." Proceedings of the IEEE/CVF International Conference on computer vision. 2021. (10 pages).

Ganin, Yaroslav, et al. "Domain-adversarial training of neural networks." Journal of machine learning research 17.59 (2016): 1-35. (35 pages).

Zhou et al., "Integration of Multi-Head Self-Attention and Convolution for Person Re-Identification", Sensors, 2022, vol. 22, 6293 (16 pages).

Adeli et al., "Representation Learning with Statistical Independence to Mitigate Bias", 2021 IEEE Winter Conference on Application of Computer Vision (WACV), pp. 2512-2522 (11 pages).

Graham et al., "One model is all you need: Multi-task learning enables simultaneous histology image segmentation and classification", Medical Image Analysis, vol. 83, 2023, 102685 (16 pages).

He et al., "MetaBalance: Improving Multi-Task Recommendations via Adapting Gradient Magnitudes of Auxiliary Tasks", arXiv:2203.06801v1 [cs.LG], Mar. 14, 2022 (11 pages).

Kamiran et al., "Discrimination Aware Decision Tree Learning", Retrieved from <https://www.researchgate.net/publication/220765322_Discrimination_Aware_Decision_Tree_Learning>, 2010 (26 pages).

Ribeiro, Marco Tulio, et al., ""Why should i trust you?" Explaining the predictions of any classifier," Proceedings of the 22nd ACM SIGKDD International Conference on Knowledge Discovery and Data Mining, 2016 (10 Pages).

Aas, Kjersti, et al., "Explaining individual predictions when features are dependent: More accurate approximations to Shapley values," Artificial Intelligence 298 (2021): 103502 (28 Pages).

Shrikumar, Avanti, et al., "Learning important features through propagating activation differences," International conference on machine learning, PMLR, 2017 (9 Pages).

Datta, Anupam, et al., "Algorithmic transparency via quantitative input influence: Theory and experiments with learning systems," 2016 IEEE symposium on security and privacy (SP), IEEE, 2016 (20 Pages).

Bach, Sebastian, et al., "On pixel-wise explanations for non-linear classifier decisions by layer-wise relevance propagation," PloS one 10.7 (2015): e0130140 (46 Pages).

Lipovetsky, Stan, et al., "Analysis of regression in game theory approach," Applied Stochastic Models in Business and Industry 17.4 (2001): 319-330 (14 Pages).

Adler, P., et al., "Auditing Black-box Modesl for Indirect Influence," 11 pp., Nov. 30, 2016.

Heng Lian at al., "Divide-and-Conquer for Debiased l1-norm Support Vector Machine in Ultra-high Dimensions" Journal of Machine Learning Research, 18, Apr. 2018, pp. 1-26 (26 pages).

Lohaus, Michaet et al., "Are two heads the same as one? identifying disparate treatment in fair neural networks", Advance in Neural Information Processing Systems 35 (2022): 16548-16562 (28 pages).

Settipalli, V. S. S., & Dasireddy, N. M. K (2021) "Reducing Unintended bias in Text Classification using Multitask learning", Master of Science in Computer Science, Jan. 2021 (82 pages).

Ragonesi, R. "Addressing Dataset Bias in Deep Neural Networks", https://tesidottorato.depositolegale: it/handle/20.500.14242/71496, 2022, Magazzini Digitali (107 pages).

T. Li., G. Convertino, W. Wang, H. Most, T. Zajonc and Y. H. Tsai, "HyperTuner: Visual Analytics for Hyperparameter Tuning by Professionals", 2018 IEEE Workshop on Machine Learning from User Interaction for Visualization and Analytics (MLUI), Berlin Germany, 2018, pp. 1-11 (11 pages).

* cited by examiner

SYSTEM AND METHOD FOR IDENTIFYING INPUT FEATURES CONTRIBUTING TO LATENT BIAS IN INFERENCE MODELS

FIELD

Embodiments disclosed herein relate generally to managing inference models. More particularly, embodiments disclosed herein relate to systems and methods to manage latent bias in inference models.

BACKGROUND

Computing devices may provide computer-implemented services. The computer-implemented services may be used by users of the computing devices and/or devices operably connected to the computing devices. The computer-implemented services may be performed with hardware components such as processors, memory modules, storage devices, and communication devices. The operation of these components may impact the performance of the computer-implemented services.

BRIEF DESCRIPTION OF THE DRAWINGS

Embodiments disclosed herein are illustrated by way of example and not limitation in the figures of the accompanying drawings in which like references indicate similar elements.

DETAILED DESCRIPTION

Figure 1:
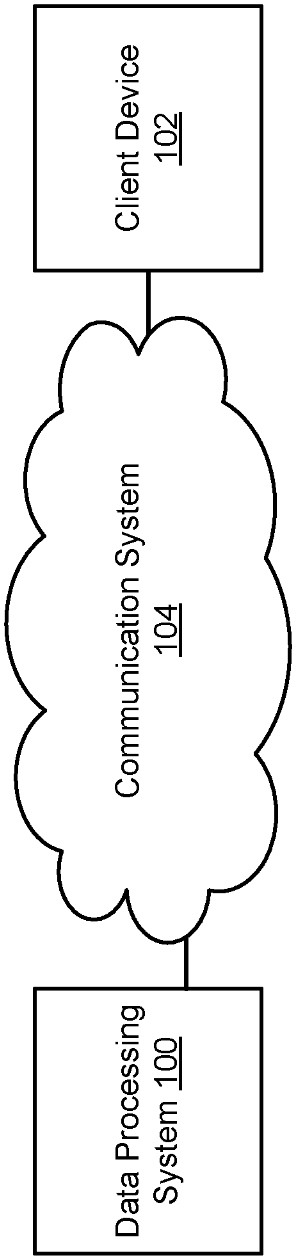
FIG. 1 shows a block diagram illustrating a system in accordance with an embodiment.

Various embodiments will be described with reference to details discussed below, and the accompanying drawings will illustrate the various embodiments. The following description and drawings are illustrative and are not to be construed as limiting. Numerous specific details are described to provide a thorough understanding of various embodiments. However, in certain instances, well-known or conventional details are not described in order to provide a concise discussion of embodiments disclosed herein.

Reference in the specification to "one embodiment" or "an embodiment" means that a particular feature, structure, or characteristic described in conjunction with the embodiment can be included in at least one embodiment. The appearances of the phrases "in one embodiment" and "an embodiment" in various places in the specification do not necessarily all refer to the same embodiment.

In general, embodiments disclosed herein relate to methods and systems for providing computer-implemented services. The computer-implemented services may be provided using inferences obtained from inference models.

The quality of the computer-implemented services may depend on the quality of the inferences provided by the inference models. The quality of the inferences provided by the inference models may depend on the source of, type of, and/or quantity of training data used to obtain the inference models, the manner in which inference models are configured using the training data, and/or other factors.

When the source, type, and/or quantity of training data is limited, latent bias may be introduced into inference models. The latent bias may cause the inference models to provide inferences of lower accuracy or have other undesirable characteristics that may cause undesirable impacts on the computer-implemented services performed using such inferences.

To reduce latent bias in inference models thereby improving the quality of inferences provided by the inference models, a modified split training may be performed. During the modified split training, an inference model that exhibits an undesirable level of latent bias may be used to obtain a multipath inference model. The multipath inference model may be trained to have low predictive power with respect to a bias feature (e.g., a feature not explicitly included in the training data, but that causes the latent bias) and high predictive power with respect to a target feature (e.g., for which the inference model exhibiting latent bias was previously trained). By doing so, inferences provided by an updated inference model based on the trained multipath inference model may not exhibit or may exhibit reduced levels of latent bias. Consequently, computer-implemented services that consume the inferences may be improved by removing the influence of latent bias on the provided services.

While the previously described modified split training process may reduce levels of latent bias exhibited by the inference model, this process may not reduce the latent bias to a degree considered acceptable by a provider and/or a recipient of the computer-implemented services. In addition, reduced levels of latent bias exhibited by the inference model may increase over time due to, for example, ongoing re-training of the inference model when new training data becomes available. This may occur, for example, due to the presence of certain features in the input of the training data set that, when present, contribute to the inference model's ability to faithfully predict the bias feature.

To determine whether input features of the training data set contribute to the inference model's ability to faithfully predict the bias feature, an analysis of the training data set may be performed. The analysis may include identifying input features associated with entries in the training data set and selecting (e.g., randomly and/or via any other method) a subset of the features. The subset of the features may be tested to determine whether the subset of features contributes more significantly to the inference model's ability to predict the output (e.g., the target feature) or to the inference model's ability to predict the bias feature. If the subset of input features makes a higher contribution to the inference model's ability to predict the bias feature than the inference model's ability to predict the target feature, the subset of the input features may be removed from the training data set. A new inference model may be trained using a new training data set generated using the remainder of the input features from the training data set and the new inference model may replace the inference model. Consequently, input features contributing to the development of latent bias exhibited by the inference model may be removed from consideration while training the new inference model and the new inference model may exhibit reduced levels of latent bias when faced with unseen input data.

In an embodiment, a method for managing an inference model that may exhibit latent bias and is trained using first training data is provided.

The method may include: obtaining a test data set, the test data set comprising at least a portion of the first training data set; performing a gradient analysis of the inference model using the test data set to obtain a latent bias score for the test data set, the latent bias score indicating a relationship between input features of the test data set and the inference model's ability to predict a bias feature; making a determination regarding whether the latent bias score exceeds a latent bias score threshold; in an instance of the determination in which the latent bias score exceeds the latent bias score threshold: removing the input features of the test data set from the first training data set to obtain an updated training data set; and obtaining a new inference model using the updated training data set to replace the inference model.

Obtaining the test data set may include: obtaining the first training data set, the first training data set comprising a listing of entries; for each entry of the listing of the entries: obtaining an input, an output, and a bias feature label; obtaining a subset of input features associated with the input; obtaining a new entry for the test data set, the new entry comprising: an input comprising the subset of the input features; the output; and the bias feature label; and adding the new entry to the test data set.

Performing the gradient analysis may include: obtaining a listing of partial latent bias scores; and aggregating the partial latent bias scores of the listing of partial latent bias scores to obtain the latent bias score.

Obtaining the listing of partial latent bias scores may include: for each entry of the test data set: obtaining a first gradient, the first gradient indicating a relationship between the input and the inference model's ability to predict the output; obtaining a second gradient, the second gradient indicating a relationship between the input and the inference model's ability to predict the bias feature label; obtaining a first partial latent bias score using the first gradient and the second gradient; and adding the first partial latent bias score to the listing of partial latent bias scores.

A negative first gradient with a larger magnitude may indicate a stronger relationship between the input and the inference model's ability to faithfully predict the output.

A negative second gradient with a larger magnitude may indicate a stronger relationship between the input and the inference model's ability to faithfully predict the bias feature.

The latent bias score threshold may be exceeded when the latent bias score is negative and has a magnitude that exceeds a magnitude indicated by the latent bias score threshold.

The inference model may include: a first inference generation path comprising a shared body portion and a first head portion; and a second inference generation path comprising the shared body portion and a second head portion.

The first inference generation path may be trained to generate inferences to predict the output and the second inference generation path is trained to generate inferences to predict the bias feature.

In an embodiment, a non-transitory media is provided that may include instructions that when executed by a processor cause the computer-implemented method to be performed.

In an embodiment, a data processing system is provided that may include the non-transitory media and a processor and may perform the computer-implemented method when the computer instructions are executed by the processor.

Turning to FIG. 1, a block diagram illustrating a system in accordance with an embodiment is shown. The system shown in FIG. 1 may provide computer-implemented services. The computer-implemented services may include, for example, database services, instant messaging services, and/or other types of computer-implemented services. The computer-implemented services may be provided by any number of data processing systems (e.g., 100). The data processing systems may provide similar and/or different computer-implemented services. The data processing systems, client device 102, and/or other devices (not shown) may utilize the computer-implemented services.

During their operation, any of the computer-implemented services may consume inferences. For example, the inferences may indicate content to be displayed as part of the computer-implemented services, how to perform certain actions, and/or may include other types of information used by the computer-implemented services during their performance.

To obtain the inferences, one or more inference models (e.g., hosted by data processing systems and/or other devices operably connected to the data processing systems) may be used. The inference models may, for example, ingest input and output inferences based on the ingested input. The content of the ingest input and output may depend on the goal of the respective inference model, the architecture of the inference model, and/or other factors.

However, if the inferences generated by the inference models do not meet expectations of the consumers (e.g., the computer-implemented services) of the inferences, then the computer-implemented services may be provided in an undesired manner. For example, the computer-implemented services may presume that the inferences generated by the inference models are of a certain degree of accuracy. If the inferences fail to meet this degree of accuracy, then the computer-implemented services may be negatively impacted.

The inferences generated by an inference model may, for example, be inaccurate if the inference models do not make inferences based on input as expected by the manager of the inference model. As noted above, to obtain inferences, the inference model may ingest input and provide output. The relationship between ingested input and output used by the inference model may be established based on training data. The training data may include known relationships between input and output. The inference model may attempt to generalize the known relationships between the input and the output.

However, the process of generalization (e.g., training processes) may result in unforeseen outcomes. For example, the generalization process may result in latent bias being introduced into the generalized relationship used by the inference model to provide inferences based on ingest input data. Latent bias may be an undesired property of a trained inference model that results in the inference model generating undesirable inferences (e.g., inferences not made as expected by the manager of the inference model). For example, training data may include a correlation that is not obvious but that may result in latent bias being introduced into inference model trained using training data. If consumed by computer-implemented services, these inaccurate or otherwise undesirable inferences may negatively impact the computer-implemented services.

Latent bias may be introduced into inference models based on training data limits and/or other factors. These limits and/or other factors may be based on non-obvious correlations existing in the training data. For example, data processing system 100 may have access to a biased source of data (e.g., a biased person) in which the training data is obtained from. The biased person may be a loan officer working at a financial institution, and the loan officer may have authority to view personal information of clients of the financial institution to determine loan amounts for each of the clients. Assume the loan officer carries discriminatory views against those of a particular ethnicity. The loan officer may make offers of low loan amounts to clients that are of the particular ethnicity, in comparison to clients that are not of the particular ethnicity. When training data is obtained from a biased source, such as the loan officer, the training data may include correlations that exist due to the discriminatory views of the loan officer. This training data may be used when placing an inference model of data processing system 100 in a trained state in order to provide inferences used in the computer-implemented services.

Due to these limits and/or other factors, such as biased sources, the training data used to train the inference model may include information that correlates with a bias feature, such as sex (e.g., male and/or female), that is undesired from the perspective of consumers of inferences generated by the inference model. This correlation may be due to the features (input data) used as training data (e.g., income, favorite shopping locations, number of dependents, etc.).

For example, a trained inference model that includes latent bias, when trained to provide inferences used in computer implemented services (to determine a risk an individual has of defaulting on loans) provided by a financial institution, may consistently generate inferences indicating female persons have a high risk of defaulting on loans. This inadvertent bias (i.e., latent bias) may cause undesired discrimination against female persons and/or other undesired outcomes by consumption of the inferences by the financial institution.

In general, embodiments disclosed herein may provide methods, systems, and/or devices for providing inference model management services in a manner that reduces the likelihood of an inference model making inferences (predictions) indicative of a bias feature. Consequently, computer-implemented services that consume the inferences may also be more likely to be provided in a manner consistent with a goal of the computer-implemented services.

To provide the inference model management services, a system in accordance with an embodiment may manage an inference model by executing a modified split training method. By doing so, the provided inference model management services may be more capable of removing, at least in part, latent bias from inference models when the inference models' predictions are indicative of a bias feature.

Before execution of the modified split training, an inference model may be identified as making predictions (i.e., inferences) that are indicative of a bias feature. The inference model may be analyzed using any method to identify presence of the bias feature.

To perform the modified split training, the inference model may be divided to obtain a multipath inference model. The multipath inference model may include two or more inference generations paths, but for simplicity of discussion, embodiments herein illustrate and are discussed with respect to a multipath inference model with two inference generation paths.

Figure 2A:
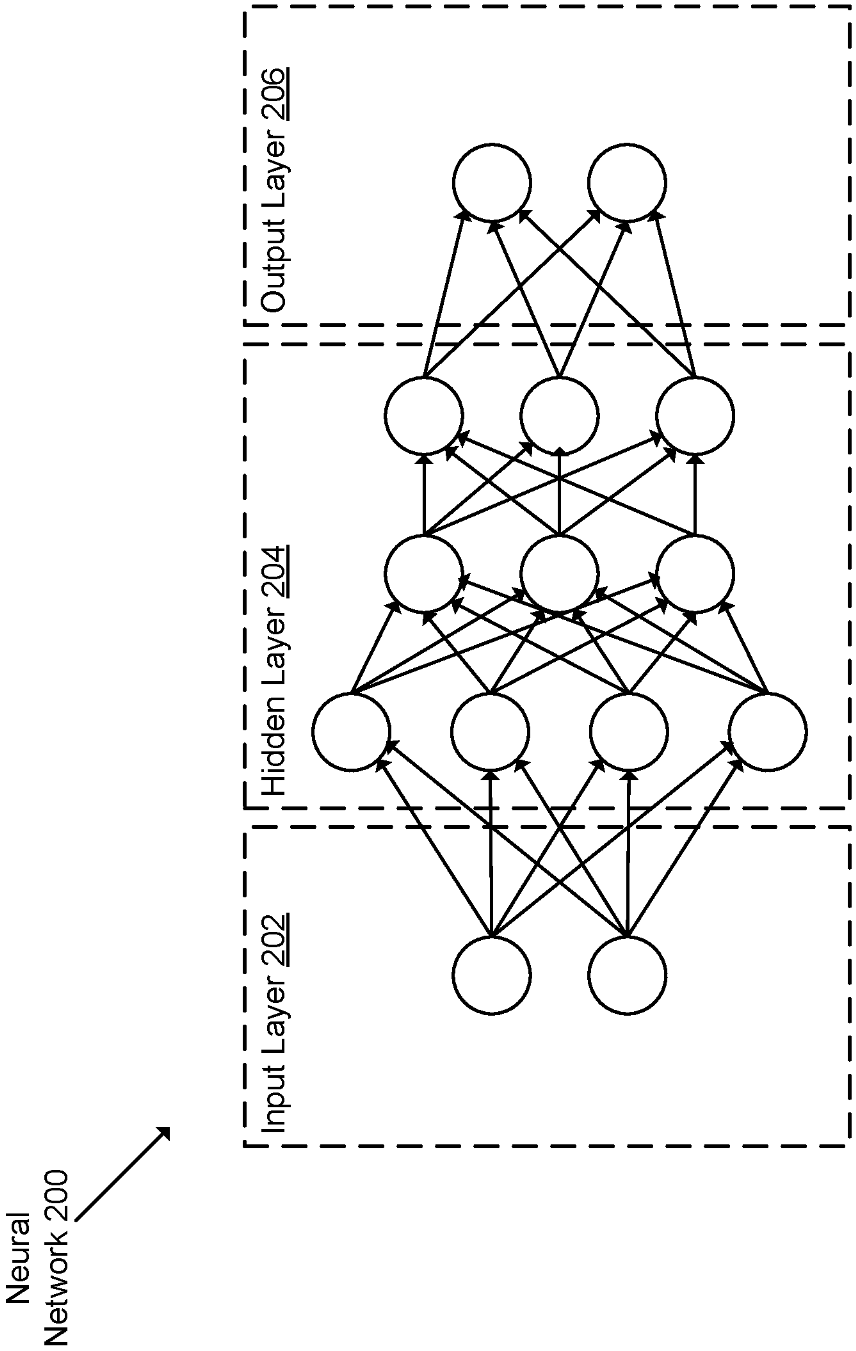
FIG. 2A shows a diagram illustrating a neural network in accordance with an embodiment.
Figure 2B:
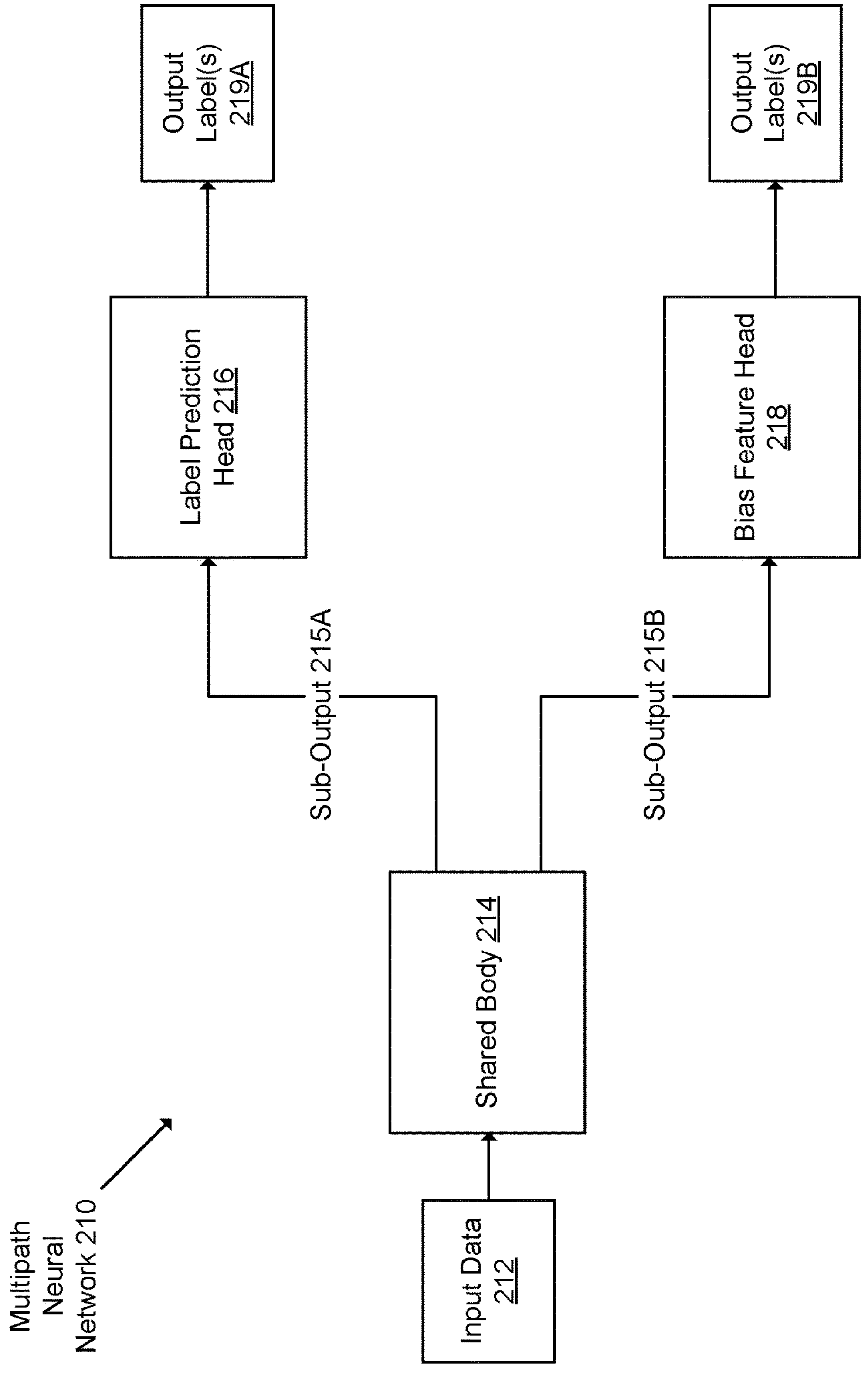
FIG. 2B-2C show diagrams illustrating a multipath neural network in accordance with an embodiment.
Figure 2C:
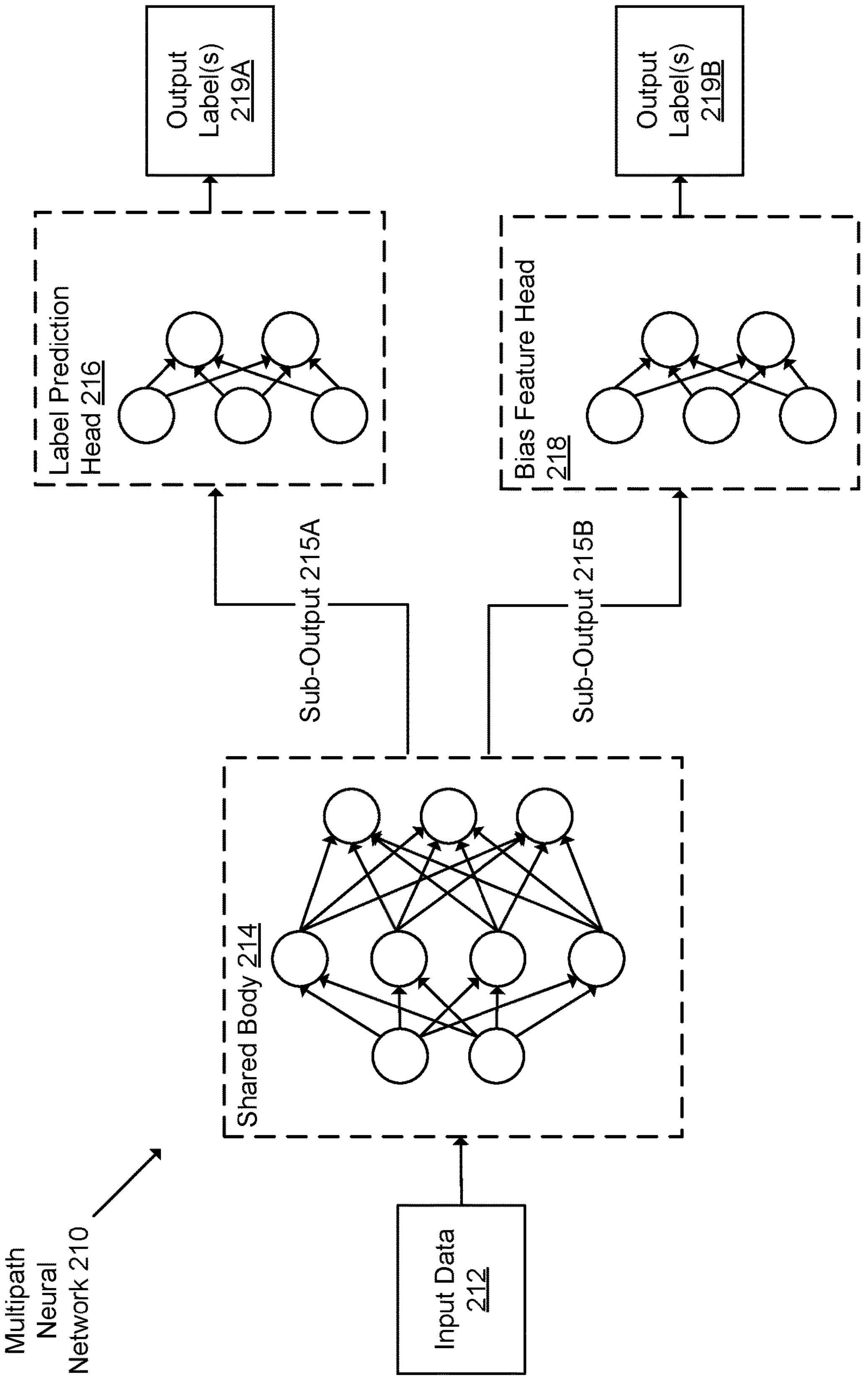

The two different inference generation paths may each operate through ingestion of data (i.e., input) into a shared body. The shared body may include an input layer and one or more hidden layers. The shared body may be connected to two independent heads that each include one or more hidden layers and/or an output layer. Refer to FIGS. 2A-2C for additional details regarding the architecture of the multipath inference model.

During the modified split training, weights of the shared body may undergo a series of freezes and unfreezes as the inference generation paths are trained. The heads of the respective inference paths may be independently trained to predict the bias feature and a desired feature. During the modified split training, the weights of the body and the respective heads may be fine-tuned. Fine tuning the weights in this manner may increase the likelihood of removing latent bias from the multipath inference model. Refer to FIGS. 3B-4C for additional details regarding modified split training.

Figure 3A:
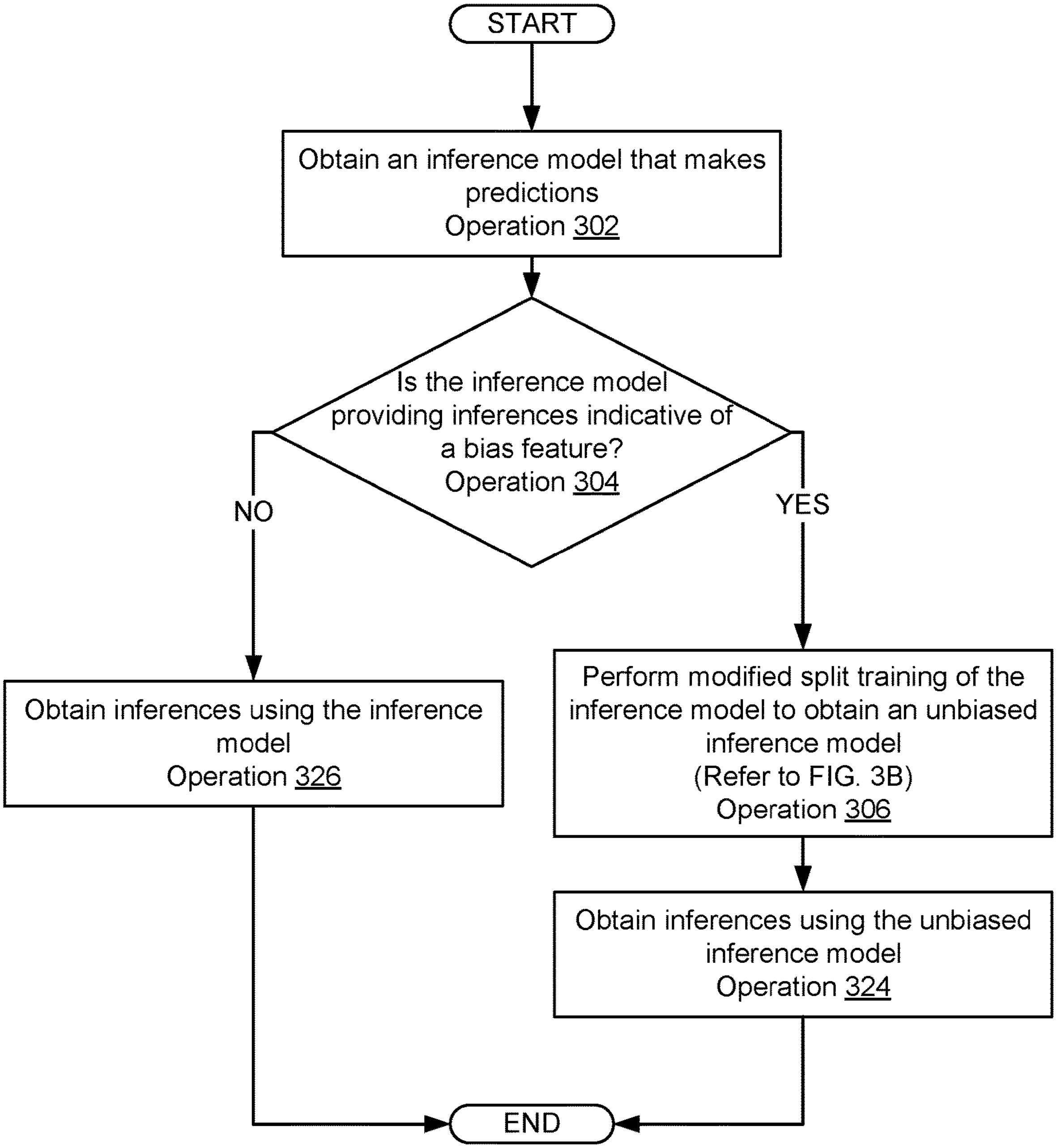
FIGS. 3A-3C show flow diagrams illustrating methods for managing inference models in accordance with an embodiment.
Figure 3B:
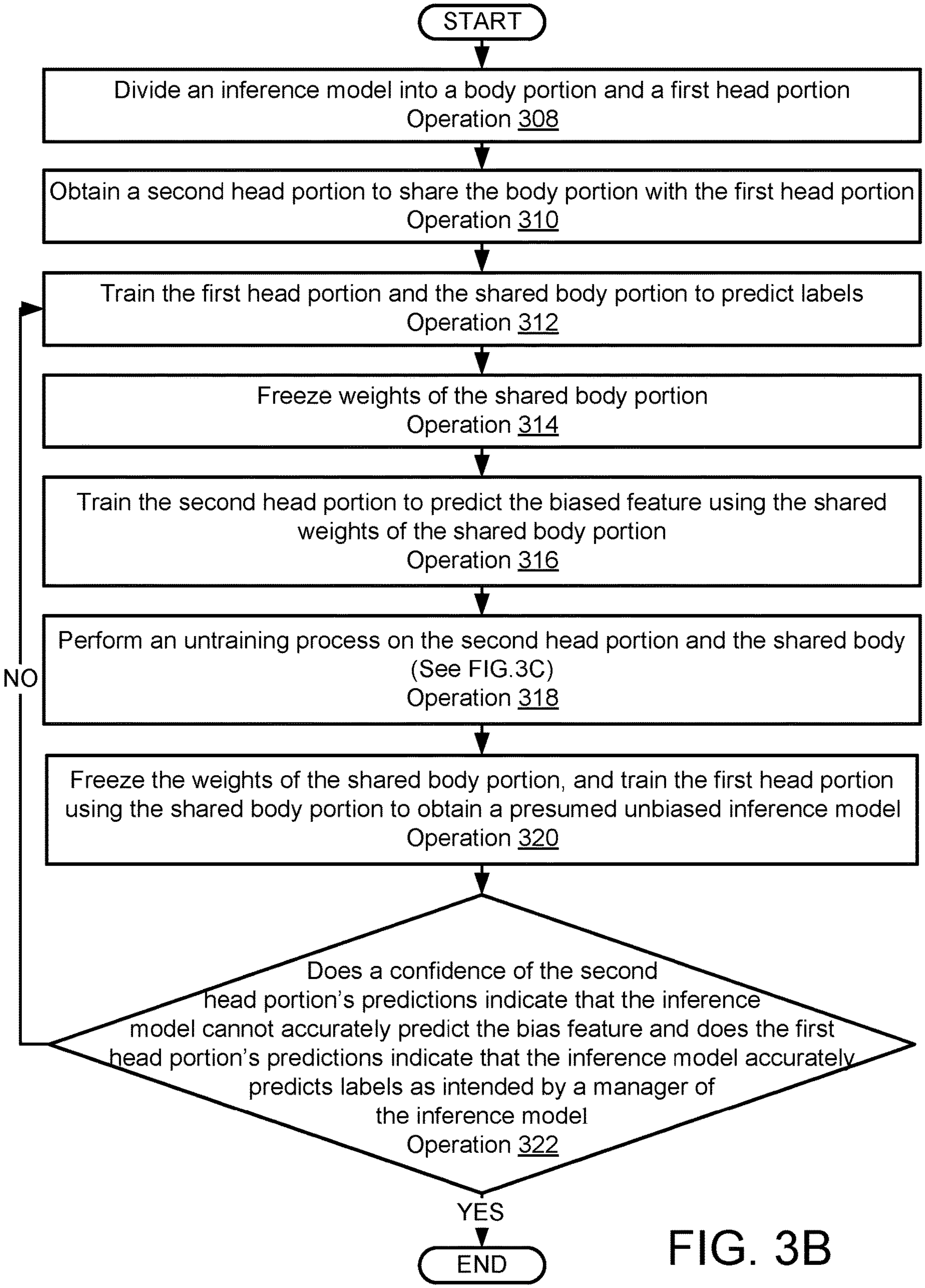
Figure 3C:
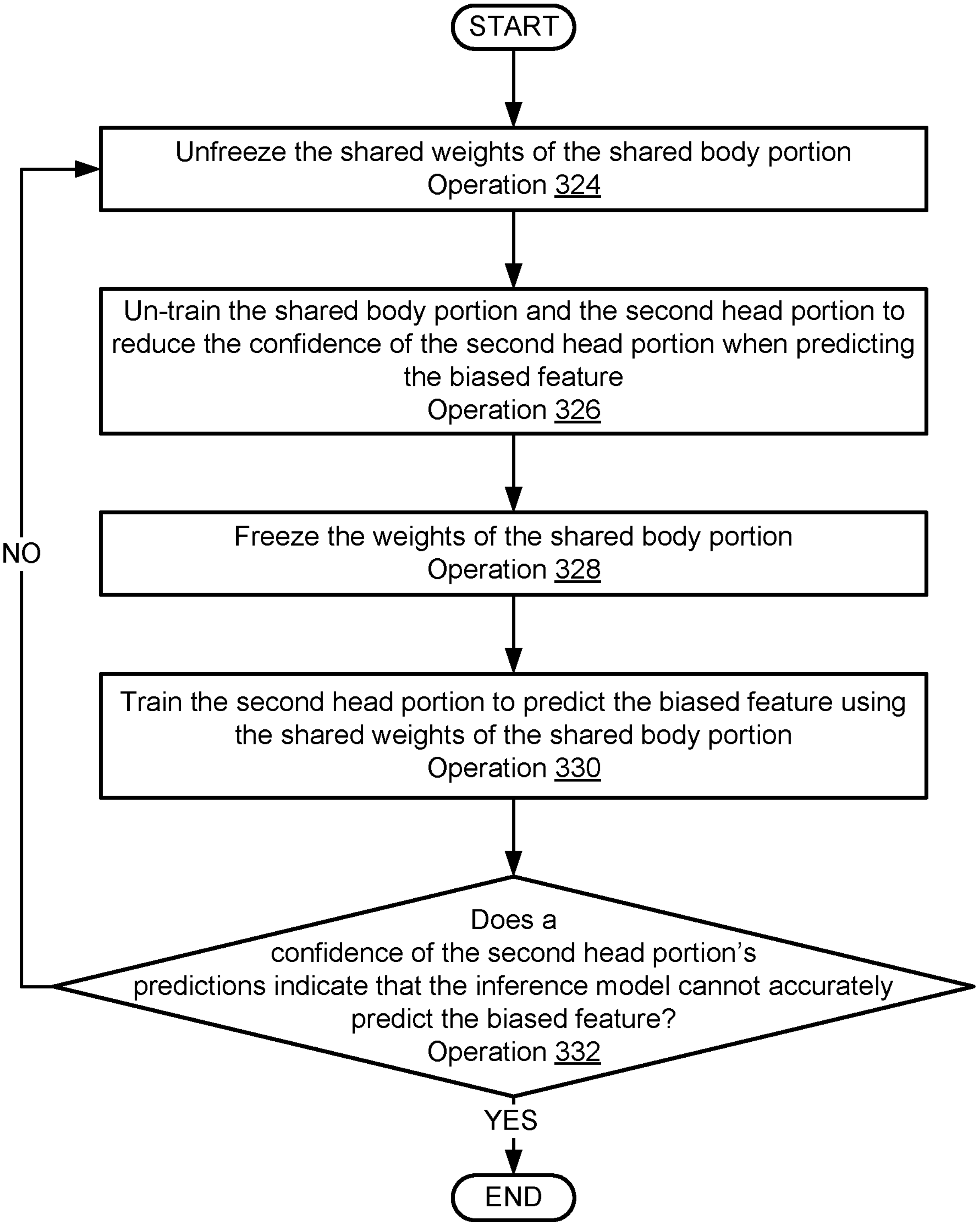
Figure 3D:
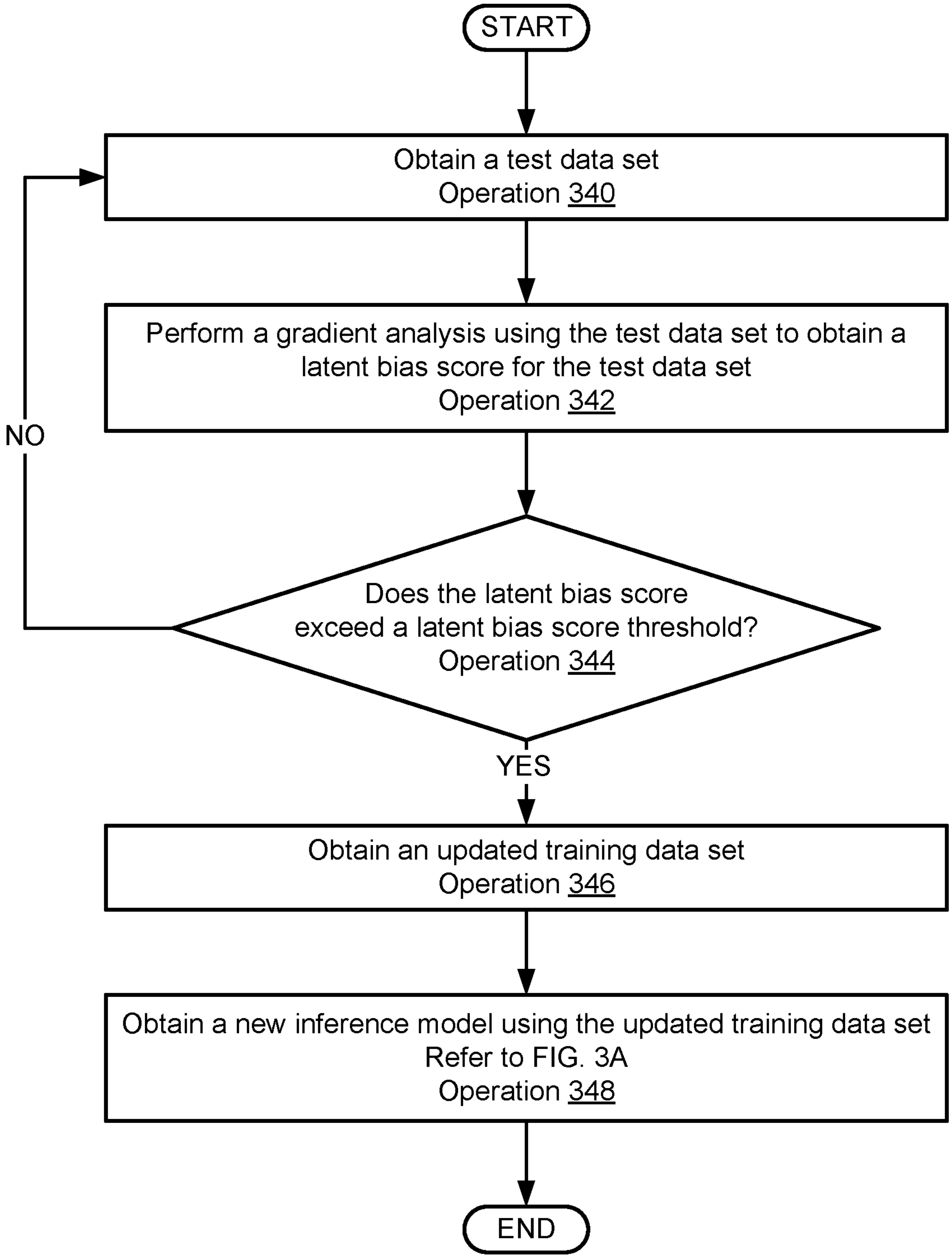
FIG. 3D shows a flow diagram illustrating a method for identifying input features contributing to latent bias exhibited by the inference model in accordance with an embodiment.

However, removing latent bias via modified split training may be unsuccessful and/or may not reduce the latent bias to a degree considered acceptable by a recipient and/or provider of the computer-implemented services. This may occur, for example, due to certain input features in the training data set disproportionally contributing to the latent bias exhibited over time by the inference model. Therefore, rather than modifying the inference model through the above-mentioned split training process (or after failed attempts), a new inference model may be obtained using a modified training data set. The modified training data set may be obtained by removing input features identified as contributing to the inference model's ability to predict the bias feature. The new inference model may replace the old inference model for inference generation purposes. Refer to FIG. 3D for additional details regarding identifying input features in training data that contribute to latent bias in trained inference models.

To provide the above noted functionality, the system may include data processing system 100, client device 102, and communication system 104. Each of these components is discussed below.

Client device 102 may consume all, or a portion, of the computer-implemented services. For example, client device 102 may be operated by a user that uses database services, instant messaging services, and/or other types of services provided by data processing system 100.

Data processing system 100 may provide inference model management services and/or computer-implemented services (e.g., used by client 102). When doing so, data processing system 100 may (i) identify whether an inference model (e.g., a trained neural network) is making predictions indicative of a bias feature, (ii) obtain an updated instance of the inference model that does not or includes a lesser degree of latent bias via modified split training and/or training a new inference model with a new training data set, (iii) use the updated inference model to obtain inferences that are unencumbered (or less uncambered) by the bias feature, and/or (iv) provide computer-implemented services using the obtained inferences.

When performing its functionality, client device 102 and/or data processing system 100 may perform all, or a portion, of the methods and/or actions described in FIGS. 2A-4C.

Data processing system 100 and/or client device 102 may be implemented using a computing device such as a host or a server, a personal computer (e.g., desktops, laptops, and tablets), a "thin" client, a personal digital assistant (PDA), a Web enabled appliance, a mobile phone (e.g., Smartphone), an embedded system, local controllers, an edge node, and/or any other type of data processing device or system. For additional details regarding computing devices, refer to FIG. 5.

Any of the components illustrated in FIG. 1 may be operably connected to each other (and/or components not illustrated) with a communication system 104. In an embodiment, communication system 104 may include one or more networks that facilitate communication between any number of components. The networks may include wired networks and/or wireless networks (e.g., and/or the Internet). The networks may operate in accordance with any number and types of communication protocols (e.g., such as the internet protocol).

While illustrated in FIG. 1 as including a limited number of specific components, a system in accordance with an embodiment may include fewer, additional, and/or different components than those illustrated therein.

To further clarify embodiments disclosed herein, inference model diagrams in accordance with an embodiment are shown in FIGS. 2A-2C. The inference model diagrams may illustrate a structure of the inference models and/or how data is processed/used within the system of FIG. 1.

Turning to FIG. 2A, a diagram illustrating a neural network (e.g., an implementation of an inference model) in accordance with an embodiment is shown.

In FIG. 2A, neural network 200 may be similar to the inference model of data processing system 100, discussed above. Neural network 200 may include a series of layers of nodes (e.g., neurons, illustrated as circles). This series of layers may include input layer 202, hidden layer 204 (which may include different sub-layers of neurons), and output layer 206. Lines terminating in arrows in this diagram indicate data relationships (e.g., weights). For example, numerical values calculated with respect to each of the neurons during operation of neural network 200 may depend on the values calculated with respect to other neurons linked by the lines (e.g., the weight associated with each line may impact the level of dependence of the value for a second neuron for the value for neuron from which the line initiates). The value calculated with respect to a first neuron may be based, at least in part, on the values of other neurons from which the arrows that terminate in the neuron initiate from.

Each of the layers of neurons of neural network 200 may include any number of neurons and may include any number of sub-layers.

Neural network 200 may exhibit latent bias when trained using training data that was obtained using a dataset that includes a bias feature, and/or data that is highly correlated with the bias feature, as discussed above. For example, neural network 200 may be trained to determine a credit limit for an individual applying for a credit line. Neural network 200 may be trained to ingest input data such as, income, number of dependents, shopping locations, etc. Neural network 200 may also be trained to output a value indicating a credit limit for the individual. The credit limit may be used by a financial institution to decide which financial offers to provide to different persons.

However, depending on the training data and training process, neural network 200 may exhibit latent bias that is based on a correlation in the training data between the lowest credit limits suggested by the network and potential clients who are a part of a protected class (e.g., clients who all are of a particular ethnicity such as Latino, or are all of a particular gender such as women, etc.). Such latent bias may arise even when, for example, neural network 200 does not ingest, as input, any explicit information regarding these characteristics of the potential clients. In this example, neural network 200 may be determined as making predictions indicative of latent bias, the latent bias being a correlation between the protected class and the lowest credit limits in the predictions.

To manage presence of bias features, embodiments disclosed herein may provide a system and method that is able to reduce and/or eliminate such bias features indicated by predictions made by inferences models. To do so, the system may modify the architecture of neural network 200. Refer to FIGS. 2B-2C for additional details regarding these modifications to the architecture of neural network 200 to manage bias features.

Turning to FIGS. 2B-2C, diagrams illustrating data structures and interactions within an inference model in accordance with an embodiment are shown.

In FIG. 2B, a diagram of multipath neural network 210 is shown. Multipath neural network 210 may be derived from neural network 200 shown in FIG. 2A. Multipath neural network 210 may be derived by (i) obtaining shared body portion 214 based on neural network 200 and (ii) adding two heads. The shared body and one head may be members of a first inference generation path and the shared body and other head may be members of a second inference generation path (it will be appreciated that other inference generation paths may be similarly obtained). Input data 212 may be any data to be ingested by multipath neural network 210.

Input data 212 may be ingested by shared body 214. Shared body 214 may include an input layer (e.g., input layer 202 of FIG. 2A) and one or more hidden layers (e.g., a portion of the sub-layers of hidden layer 204 of FIG. 2A).

During operation, shared body 214 may generate intermediate outputs (e.g., sub-output 215A-215B) consumed by the respective heads (e.g., 216, 218) of multipath neural network 210.

Label prediction head 216 may include some number of hidden layers (e.g., that include weights that depend on the values of nodes of shared body 214), and an output layer through which output label(s) 219A are obtained. Similarly, bias feature head 218 may include some number of hidden layers (e.g., that include weights that depend on the values of nodes of shared body 214), and an output layer through which output label(s) 219B are obtained. Output label(s) 219A and 219B may be the inferences generated based on input data 216 by multipath neural network.

A first inference generation path may include shared body 214 and label prediction head 216. This first inference generation path may, upon ingestion of input data 212, generate output label(s) 219A. The first inference generation path may attempt to make predictions as intended by neural network 200.

A second inference generation path may include shared body 214 and bias feature head 218. This second inference generation path may, upon ingestion of input data 212, generate output label(s) 219B. The second inference generation path may attempt to make predictions of an undesired bias feature indicated by predictions made by neural network 200.

Any of shared body 214, label prediction head 216, and bias feature head 218 may include neurons. Refer to FIG. 2C for additional details regarding these neurons.

Turning to FIG. 2C, a diagram illustrating multipath neural network 210 in accordance with an embodiment is shown. As seen in FIG. 2C, shared body 214, label prediction head 216, and bias feature head 218 may each include layers of neurons. Each of shared body 214, label prediction head 216, and bias feature head 218 may include similar or different numbers and arrangements of neurons.

While not illustrated in FIG. 2C, the values for some of the neurons of label prediction head 216 and bias feature head 218 calculated during operation of multipath neural network 210 may depend on the values calculated for some of the neurons of shared body 214. These dependences (i.e., weights) are represented by sub-output 215A and sub-output 215B.

While illustrated in FIGS. 2A-2C as including a limited number of specific components, a neural network and/or multipath neural network may include fewer, additional, and/or different components than those illustrated in these figures without departing from embodiments disclosed herein.

As discussed above, the components and/or data structures of FIG. 1 may perform various methods to provide inference model management services in a manner that reduces the likelihood of an inference model providing inferences (predictions) indicative of a bias feature. FIGS. 3A-3B illustrate methods that may be performed by the components of FIG. 1. In the diagrams discussed below and shown in these figures, any of the operations may be repeated, performed in different orders, omitted, and/or performed in parallel and/or a partially overlapping in time manner with other operations.

Turning to FIG. 3A, a flow diagram illustrating a method of managing an inference model in accordance with an embodiment is shown. The method may be performed, for example, by a data processing system, a client device, a communication system, and/or other components and/or data structures illustrated in FIGS. 1-2C.

At operation 302, an inference model that makes predictions is obtained (e.g., a trained neural network). The inference model may be obtained through various processes such as (i) generation through training with a training data set, (ii) acquisition from an external entity, and/or (iii) by other process.

For example, an inference model may be received from another entity through a communication system (e.g., communication system 104). In a second example, an inference model may be obtained using a set of training data and a training system through which values of weights of a neural network are set. In the second example, the set of training data may be used in concert with a machine learning model (and/or other type of inference generation model) to obtain the inference model based on relationships defined by the set of training data (which may lead to latent biased being introduced into the inference model).

At operation 304, a determination is made regarding whether the inference model is providing inferences indicative of a bias feature. The determination may be made by identifying correlations between the outputs of the inference model and, for example, protected class data (e.g., characterizations of individuals such as, but not limited to, race and/or sex,) or other types of features that may not be desired. If a level of the correlation exceeds a threshold, then it may be determined that the inferences exhibit latent bias.

The determination is made by presuming that any newly generated inference model provides inferences indicative of a bias feature. The presumed bias feature may be one or more based on a regulatory environment to which an organization using the inference model is subject.

If the inference model is determined to be providing inferences indicative of the bias feature, then the method may proceed to operation 306. Otherwise, the method may proceed to operation 326.

At operation 306, modified split training of the inference model is performed to obtain an unbiased inference model. The modified split training may be performed by (i) obtaining a multipath inference model using the inference model, and (ii) using a co-training process, (a) training one of the inference paths of the multipath inference model to infer the labels (outputs) that the inference model was trained to infer and (b) training the other inference path to be unable to predict the bias feature. The one of the inference paths may be used as the unbiased inference model.

As noted above, inference models may be presumed to make predictions indicative of bias features. Modified split training for these inference models may be automatically performed for any number of the presumed bias features. Refer to FIG. 3B for additional details regarding the modified split training.

At operation 324, inferences are obtained using the unbiased inference model. The inferences may be obtained using the unbiased inference model by ingesting input data into the unbiased inference model. The unbiased inference model may output the inferences (e.g., for the labels intended to be generated by the inference model obtained in operation 302).

The method may end following operation 324.

Returning to operation 304, the method may proceed to operation 326 when inference models are determined to be making inferences that are not indicative of the bias feature.

At operation 326, inferences are obtained using the inference model (e.g., obtained in operation 302). The inferences may be obtained using the inference model by ingesting input data into the inference model. The inference model may output the inferences (e.g., for the labels intended to be generated by the inference model obtained in operation 302).

The method may end following operation 326.

Turning to FIG. 3B, a flow diagram illustrating a method of obtaining an unbiased inference model in accordance with an embodiment is shown. The method may be performed, for example, by a data processing system, a client device, a communication system, and/or other components illustrated in FIG. 1.

At operation 308, an inference model (e.g., the inference model obtained in operation 302) is divided to obtain a shared body. The inference model may be divided by splitting the inference model. The shared body portion may include an input layer and one or more hidden layers.

A label prediction head may also be obtained. For example, from the remaining portion of the divided inference model that is not part of the shared body may be used as the label prediction head (e.g., a first head portion). The label prediction head may include one or more hidden layers and an output layer.

At operation 310, a second head portion is obtained. The second head portion may be obtained by (i) duplicating the label prediction head, (ii) generating a structure that may or may not include different numbers of neurons in the layers and/or different numbers of layers than that of the label prediction head, and/or (iii) via other processes. The second head portion may be a bias feature head, as discussed above.

At operation 312, the first head portion and the shared body portion are trained to predict labels (e.g., output labels 219A). This training may be regarded as a preparation training procedure. The first inference generation path may be trained to predict the labels by (i) using training data obtained for training of the inference model as intended by a manager of the inference model, and (ii) using the training data obtained to train the inference model in operation 302.

At operation 314 weights of the shared body portion are frozen. The weights (henceforth referred to as "the shared weights") may be frozen by placing the shared weights in an immutable state. This immutable state may prevent the shared weights from changing values during training. In contrast, while unfrozen, the shared weights may be modified through training.

At operation 316, the second head portion is trained to predict a bias feature (e.g., the bias feature discussed with respect to operation 304) using the frozen shared weights of the shared body portion. This training may be regarded as a first training procedure. The second head portion may be trained to predict the bias feature by (i) identifying the bias feature based on a previously identified correlation (as discussed with respect to FIG. 3A) to obtain bias feature training data, and (ii) bias feature training the second inference generation path using the bias feature training data.

The bias feature training data may establish a relationship (i.e., the correlation) between the input of the training data used to obtain the inference model and the bias feature.

By doing so, the second inference generation path may be trained to predict the bias feature with a high level of confidence. During the first training procedure, the weights of the shared body may be frozen while the weights of the bias feature head may be unfrozen.

At operation 318, an untraining process is performed on the second head portion and the body portion. As noted above, inference models may be presumed to make predictions indicative of a bias feature and the second inference generation path may be trained in a manner that causes the second inference generation path to be unable to predict the bias feature. This untraining process of the second inference generation path may be automatically performed for any number of the presumed bias features. Refer to FIG. 3C for additional details regarding the untraining process.

At operation 320 the shared weights of the shared body portion are frozen (as described with respect to operation 314) and the first head portion is trained using the shared body portion to obtain an unbiased inference model. This training may be regarded as a second training procedure. The shared body and the first head portion (e.g., in aggregate, the first inference generation path) may be trained by using training data upon which the original inference model was trained.

By freezing the weights of the shared body during the second training procedure, latent bias may be less likely or prevented from being introduced into the first inference generation path. Thus, during the second training procedure, only the weights of the label prediction head may be modified.

At operation 322 a second determination is made regarding whether a predictive ability of the second head portion's predictions indicate that the inference model cannot accurately predict the bias feature and/or that the first head portion's predictions can accurately predict the labels intended to be generated by the inference model obtained in operation 302. The second determination may be made by testing the confidence of the second inference generation path when predicting the bias feature and testing the confidence of the first inference generation path when predicting the labels.

The second head portion's predictions may be determined to be inaccurate when the confidence of the second head portion's predictions is not within a first predefined threshold. Otherwise, it may be determined that the second head portion's predictions are accurate, and therefore, the confidence may be within the second predefined threshold.

Additionally, the second determination may include testing the predictive power of the first inference generation path when making predictions, the predictive power indicating whether the first inference generation path is capable of making accurate predictions. The first inference generation path may be determined to be making accurate predictions when the predictive power of the first inference generation path's predictions is within a second predefined threshold. Otherwise, it may be determined that the first inference generation path's predictions are inaccurate, and therefore, the confidence may not be within the second predefined threshold.

If the confidence is determined to not be within the first predefined threshold (e.g., sufficiently low), and the predictive power is within the second predefined threshold, then the method may end following operation 322. If the confidence is determined to be within the first predefined threshold (e.g., sufficient high), and/or the predictive power is not within the second predefined threshold, then the method may loop back to operation 312 (to repeat operations 312-320). It will be appreciated that upon completion of the second determination that the weights of the shared body are to be unfrozen.

By looping back through operations 312-320, the level of latent bias in the shared body portion may be progressively reduced until it falls below a desired level (e.g., which may be established based on the first predefined threshold).

Returning to FIG. 3A, the method may proceed to operation 324 following operation 306.

Turning to FIG. 3C, a flow diagram illustrating a method of performing an untraining procedure on an inference model in accordance with an embodiment is shown. The method may be performed, for example, by a data processing system, a client device, a communication system, and/or other components illustrated in FIG. 1. The method may also be performed, for example, on the multipath inference model discussed with regard to FIG. 3A-3B.

At operation 324, the shared weights of the shared body portion are unfrozen. In contrast to operation 314, the shared weights may be unfrozen by placing the shared weights in a mutable state. This mutable state may allow the shared weights to change values during training.

At operation 326, the shared body portion and the second head portion (the second inference generation path) are un-trained (e.g., with respect to the bias feature) to reduce the predictive ability for predicting the bias feature. This un-training may be referred to as an untraining procedure.

To perform the untraining, the second inference generation path may be un-trained by utilizing, for example, a gradient ascent process (in contrast to a gradient descent process for optimizing inferences made by inference models) to increase the inaccuracy and/or reduce the predictive ability of the second inference generation path when inferring the bias feature based on ingest data. In contrast to operation 316, during operation 326 the weights of both the shared body and bias prediction head may be modified thereby reducing the latent bias in the shared body portion.

It will be appreciated that, as noted above, any of the operations may be performed multiple times. For example, operations 324-332 may be performed more than once prior to performing operation 320. The number of times operation 324 is performed may be selected, for example, to reduce the level of latent bias exhibited by the second inference generation path by a predetermined amount or a predetermined level.

At operation 328, the weights of the shared body portion are frozen. The weights (henceforth referred to as "the shared weights") may be frozen by placing the shared weights in an immutable state, as described with respect to operation 314. This immutable state may prevent the shared weights from changing values during training. In contrast, while unfrozen, the shared weights may be modified through training.

At operation 330, the second head portion is trained to predict the bias feature (e.g., the bias feature discussed with respect to operation 304) using the frozen shared weights of the shared body portion, as described with respect to operation 316.

By doing so, the second inference generation path may be recalibrated to predict the bias feature with the shared changed body. The weights of the shared body may be frozen while the weights of the bias feature head may be unfrozen.

At operation 332 a third determination is made regarding whether a predictive ability of the second head portion's predictions indicate that the inference model cannot accurately predict the bias feature. The third determination may be made by testing the confidence of the second inference generation path when predicting the bias feature.

The second head portion's predictions may be determined to be inaccurate when the predictive ability of the second head portion's predictions is not within a first predefined threshold (similarly described with respect to FIG. 3B). It will be appreciated that in some instances the threshold may be different to that discussed with respect to FIG. 3B.

If the predictive ability is determined to not be within the first predefined threshold (e.g., sufficiently low), then the method may end following operation 332. If the confidence is determined to be within the first predefined threshold (e.g., sufficient high), then the method may loop back to operation 324 (to repeat operations 324-330).

By looping back through operations 324-330, the level of latent bias in the shared body portion may be progressively reduced until it falls below a desired level (e.g., which may be established based on the first predefined threshold).

Using the methods illustrated in FIGS. 3A-3C, embodiments disclosed herein may facilitate management of inference models which may reduce the likelihood of the inference models making inferences indicative of a bias feature despite limited training data. For example, by using modified split training to manage inference models, inference models may be more reliable in providing inferences that do not lead to discrimination of an individual based on protected class data associated with the individual and/or otherwise including latent bias.

Turning to FIG. 3D, a flow diagram illustrating a method for identifying input features contributing to latent bias exhibited by the inference model in accordance with an embodiment is shown. The method may be performed, for example, by a data processing system, a client device, a communication system, and/or other components illustrated in FIG. 1. The method may also be performed, for example, on the multipath inference model discussed with regard to FIG. 3A-3C.

At operation 340, a test data set is obtained. The test data set may include at least a portion of the first training data set. The first training data set may include a listing of entries. To obtain the test data set, the first training data set may be obtained and one or more of the following steps may be performed for each entry in the listing of entries of the first training data set: (i) obtaining an input, an output, and a bias feature label, (ii) obtaining a subset of input features associated with the input, (iii) obtaining a new entry for the test data set using the subset of the input features, and/or (iv) adding the new entry to the test data set. These steps may be performed for each entry in the first training data set to obtain a test data set with the same number of entries as the first training data set.

Obtaining the first training data set may include reading the first training data set from storage, requesting the first training data set from another entity responsible for managing and/or generating training data sets, and/or obtaining credentials to access a database where the first training data set is stored.

Obtaining the input, output, and bias feature label may be performed by obtaining a first entry of the listing of entries included in the training data set. The first entry of the listing of the entries may include an input and an output. If the input and output are not included in the entry, the entry may include instructions for how to retrieve the input and output from another location (e.g., storage). The bias feature label may not be included in the entry. To obtain the bias feature label, the bias feature label may be requested from another entity responsible for storing additional information regarding the first training data set. The bias feature label may also be generated by requesting the bias feature label (e.g., a user's age) from the user themselves via an email, text message, and/or notification through an application on a device. The bias feature label may be obtained via other methods without departing from embodiments disclosed herein.

The subset of the input features associated with the input may be obtained by identifying a listing of input features associated with each entry of the first training data set and selecting a subset of the input features from the listing of the input features. Selecting the subset of the input features may be performed by randomly choosing a subset of the input features, by systematically choosing subsets of different sizes and compositions, and/or by transmitting the input features to another entity and receiving subsets of the input features as a response from the entity responsible for selecting the subsets of the input features.

The new entry for the test data set may be obtained by generating a data structure and populating the data structure with the new entry. The new entry may include an input (including the subset of the input features), the output, and the bias feature label. The new entry may be obtained by transmitting the subset of input features, the output, and the bias feature label to another entity responsible for generating the new entry. The new entry may be obtained via other methods without departing from embodiments disclosed herein.

The new entry may be added to the test data set by generating a data structure (e.g., a blank or partially populated data set) and populating the data structure with the new entry. The new entry may also be transmitted to another entity responsible for compiling the test data set using the new entry.

At operation 342, a gradient analysis is performed using the test data set to obtain a latent bias score for the test data set. The latent bias score may indicate a relationship between input features of the test data set (e.g. the subset of input features selected from the first training data set) and the inference model's ability to predict a bias feature (e.g., the bias feature corresponding to the bias feature labels in each entry of the test data set).

The gradient analysis may be performed by: (i) obtaining a listing of partial latent bias scores, and (ii) aggregating the partial listing of bias scores of the listing of bias scores to obtain the latent bias score.

To obtain a listing of partial latent bias scores, any of the following steps may be performed for each entry in the test data set: (i) obtaining a first gradient, (ii) obtaining a second gradient, (iii) obtaining a first partial latent bias score using the first gradient and the second gradient, and/or (iv) adding the first partial latent bias score to the listing of the partial latent bias scores.

The first gradient may indicate a relationship between the input and the inference model's ability to predict the output. The first gradient may be obtained by: (i) obtaining an output inference using the inference model and the input as ingest for the inference model, the output inference being intended to match the output associated with the input, and/or (ii) determining the extent of impact of the input on the inference model's ability to faithfully predict the output. The first gradient may be obtained via other methods (e.g., transmitting the first entry to another entity responsible for obtaining the first gradient) without departing from embodiments disclosed herein.

The output inference may be obtained using a first inference generation path of the inference model. The first inference generation path may include a shared body portion and a first head portion. The shared body portion and the first head portion may each include, for example, a number of neurons (or layers of neurons) of a neural network inference model. The first inference generation path may be trained to generate inferences to predict the output. Refer to FIGS. 2A-2C for additional details regarding the architecture of the inference model.

To obtain the first gradient, a loss function representing the inference model's ability to faithfully predict the output inferences over the entire range of the input values in the test data set may be obtained. The first gradient may be the gradient of the function at the point specified by the first entry of the test data set. The gradient may be a negative number if the input features increase the likelihood that the inference model will faithfully predict the output. A negative first gradient with a higher magnitude may indicate a stronger relationship between the input and the inference model's ability to faithfully predict the output.

The second gradient may indicate a relationship between the input and the inference model's ability to faithfully predict the bias feature label. The second gradient may be obtained by: (i) obtaining a bias inference using the inference model and the input as ingest for the inference model, the bias inference being intended to match the bias feature label associated with the input, and/or (ii) determining the extent of impact of the input on the inference model's ability to faithfully predict the bias feature. The second gradient may be obtained via other methods (e.g., transmitting the first entry to another entity responsible for obtaining the second gradient) without departing from embodiments disclosed herein.

The bias inference may be obtained using a second inference generation path of the inference model. The second inference generation path may include the shared body portion and a second head portion. The shared body portion and the second head portion may each include, for example, a number of neurons (or layers of neurons) of a neural network inference model. The second inference generation path may be trained to generate inferences to predict the bias feature. Refer to FIGS. 2A-2C for additional details regarding the architecture of the inference model.

To obtain the second gradient, a loss function representing the inference model's ability to faithfully predict the bias feature over the entire range of the input values in the test data set may be obtained. The second gradient may be the gradient of the loss function at the point specified by the first entry. The second gradient may be a negative number if the input features increase the likelihood that the inference model will faithfully predict the bias feature label. A negative second gradient with a larger magnitude may indicate a stronger relationship between the input and the inference model's ability to faithfully predict the bias feature.

The first partial latent bias score may be obtained by: (i) obtaining a scalar value associated with the first gradient and a scalar value associated with the second gradient, and (ii) performing a subtraction process by subtracting the scalar value associated with the first gradient from the scalar value associated with the second gradient. The first gradient and the second gradient may be subtracted by transmitting the first gradient and the second gradient to another entity responsible for generating partial latent bias scores.

The first partial latent bias score may also be obtained by: (i) obtaining the first gradient, (ii) obtaining the second gradient, and/or (iii) treating the first gradient and the second gradient as the first partial latent bias score.

The first partial latent bias score may be added to the listing of partial latent bias scores by generating a data structure and populating the data structure with the first partial latent bias score. The listing of partial latent bias scores may be generated by another entity and/or the first partial latent bias score may be transmitted to another entity responsible for compiling the listing of partial latent bias scores.

The latent bias score may be obtained by obtaining the listing of partial latent bias scores and aggregating the partial latent bias scores in the listing of partial latent bias scores. The latent bias score may also be obtained by transmitting the listing of partial latent bias scores to another entity responsible for comparing the partial latent bias scores to obtain the latent bias score.

Aggregating the partial latent bias scores may include, for example, adding the partial latent bias scores. The latent bias score may be aggregated using other methods without departing from embodiments disclosed herein. The latent bias score may include a scalar value that is either positive or negative. A positive latent bias score (and/or a negative latent bias score with a magnitude that does not exceed a threshold) may indicate that the subset of input features included in the input of the test data set may contribute more strongly to the inference model's ability to faithfully predict the output than the inference model's ability to faithfully predict the bias feature. A negative latent bias score (with a magnitude above a certain threshold) may indicate that the subset of input features included in the input of the test data set may contribute more strongly to the inference model's ability to faithfully predict the bias feature than the inference model's ability to faithfully predict the output.

At operation 344, it is determined whether the latent bias score exceeds a latent bias score threshold. The latent bias score threshold may be exceeded when the latent bias score is negative and has a magnitude that exceeds a magnitude indicated by the latent bias threshold. For example, the latent bias score threshold may be −1.56. Therefore, any test data set with an associated negative latent bias score with a magnitude that is greater than 1.56 may exceed the inference bias score threshold. If the latent bias score exceeds the latent bias score threshold, the method may proceed to operation 346. If the latent bias score does not exceed the latent bias score threshold, the method may return to operation 340.

At operation 346, an updated training data set is obtained. To obtain the updated training data set, the input features of the test data set may be removed from the first training data set. Removing the input features of the test data set from the first training data set may include: (i) obtaining the listing of the input features associated with the input of the first training data set, (ii) removing the input features associated with the test data set from each entry of the first training data set, and (iii) treating the remaining input features as the input features of the updated training data set.

At operation 348, a new inference model is obtained using the updated training data set. The new inference model may be obtained in order to replace the inference model. The new inference model may be obtained as described in operation 302 of FIG. 3A but using the updated training data set in place of the training data set. Refer to FIG. 3A for additional details regarding obtaining inference models.

The method may end following operation 348.

Figure 4A:
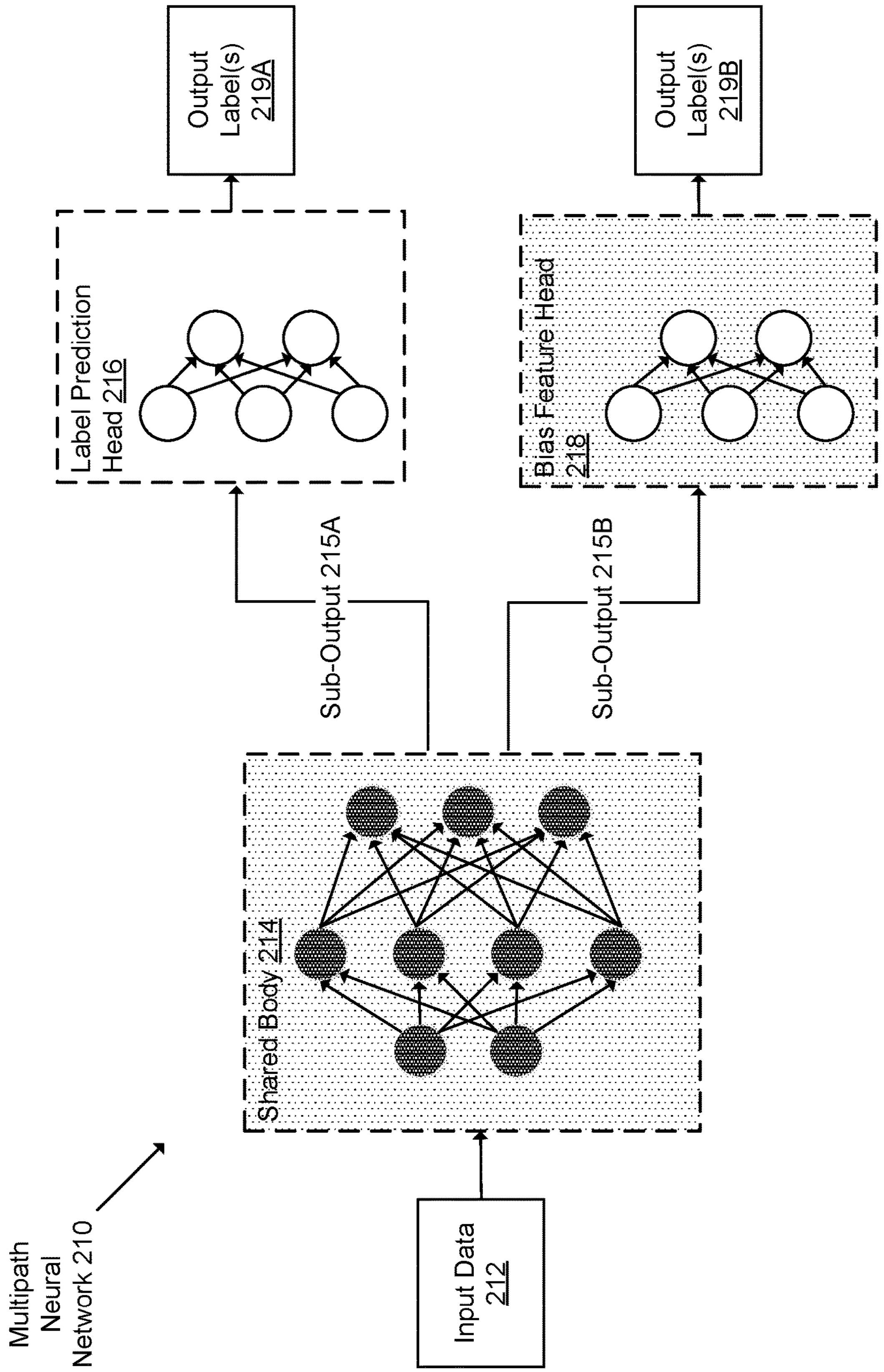
FIGS. 4A-4C show diagrams illustrating data structures and interactions during management of an inference model in accordance with an embodiment.
Figure 4B:
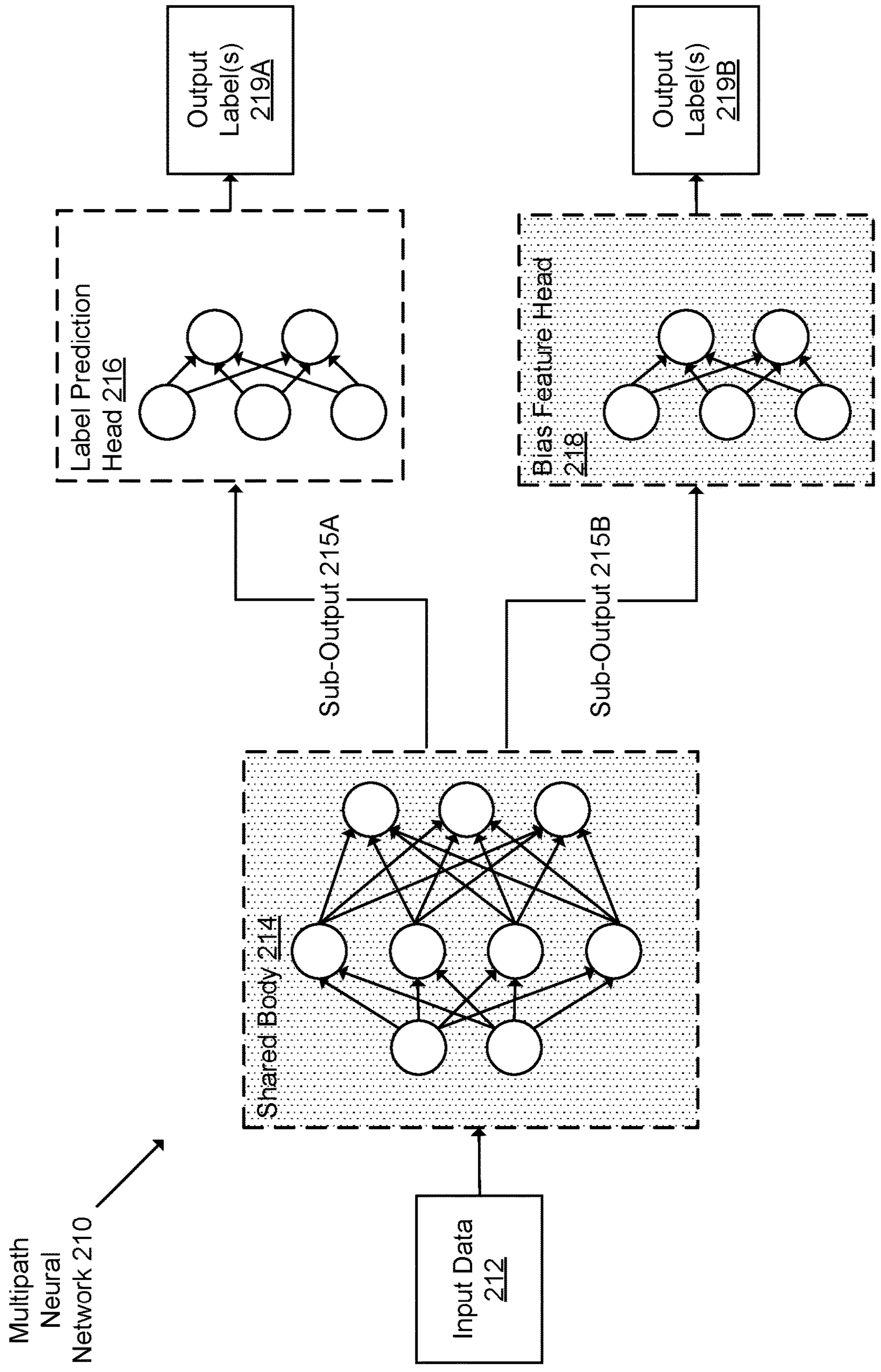
Figure 4C:
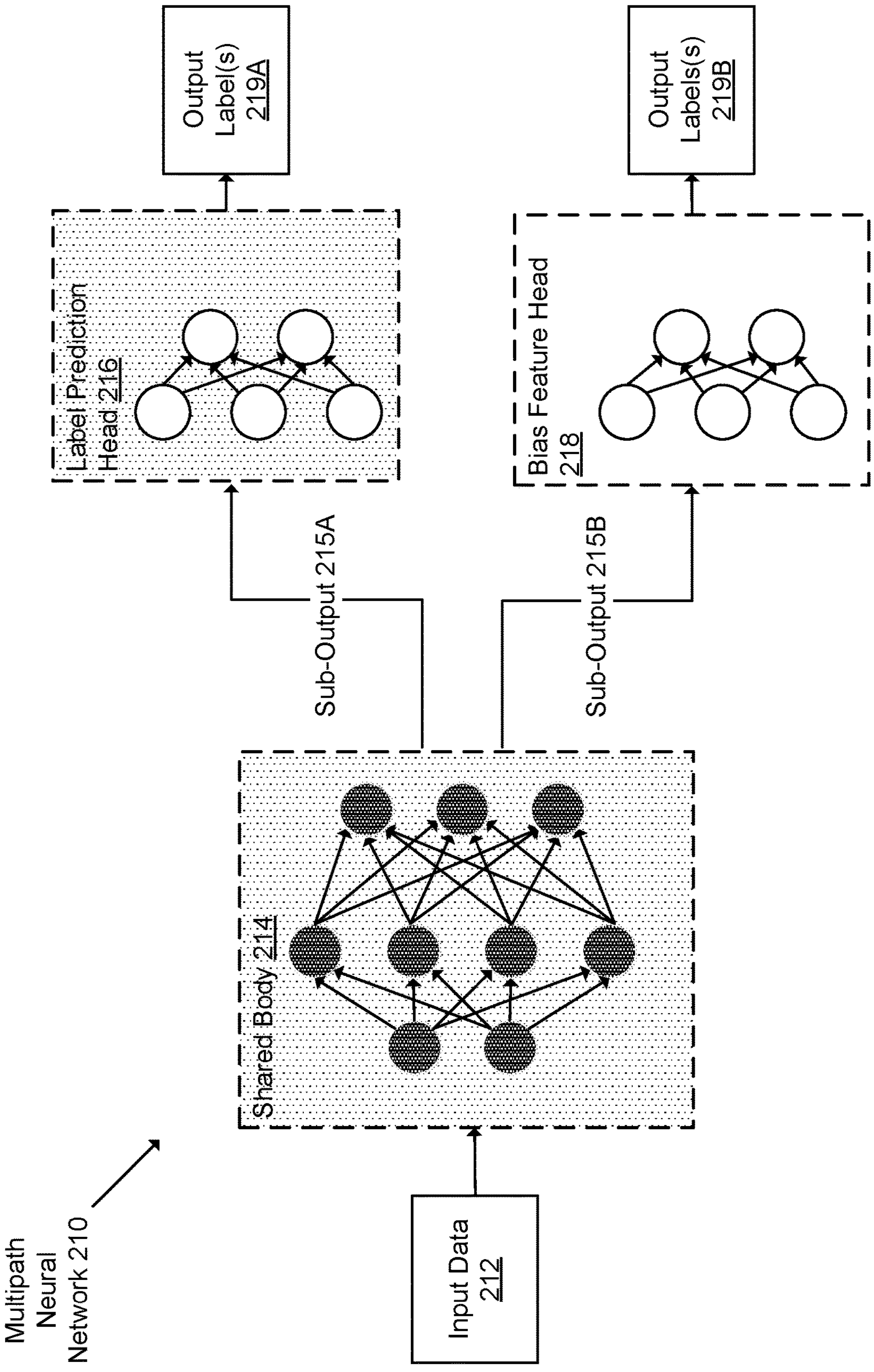

To further clarify embodiments disclosed herein, an example implementation in accordance with an embodiment is shown in FIGS. 4A-4C. These figures show diagrams illustrating data structures and interactions during management of an inference model in accordance with an embodiment. While described with respect to inference model management services, it will be understood that embodiments disclosed herein are broadly applicable to different use cases as well as different types of data processing systems than those described below.

Consider a scenario in which a bank offers various loans (of varying amounts) over time to clients of the bank. The bank may utilize an inference model (e.g., a neural network) to determine a loan amount to offer its clients. The inference model may be trained to ingest input such as mortgage, credit debt, types of purchases, etc. of a client. The inference model may proceed to output a value corresponding to a loan amount to offer the client.

Assume that over time a correlation between low loan amounts and a race of the clients (e.g., clients of African American descent) is identified in the inferences generated by the neural network. To avoid perpetuating discrimination towards clients of the particular race, the bank may utilize modified split training to manage the inference model (as discussed previously). This management of the inference model may reduce the likelihood of there being bias associated with the inferences made by the inference model. By doing so, a neural network (similar to neural network 200 of FIG. 2A) may be divided to obtain a multipath inference model (similar to multipath neural network 210 of FIG. 2C).

As shown in FIGS. 4A-4C, once the two inference generation paths have been obtained (first and second inference generation paths as discussed with respect to FIG. 2A-2C), a series of training procedures (as part of the modified split training) may be executed.

Turning to FIG. 4A, a diagram illustrates a first training procedure for the second inference generation path of multipath neural network 210 in accordance with an embodiment is shown. The training procedure may set weights the second inference generation path to predict the bias feature (e.g., ingested input that is identified as causing the correlation). This first training procedure is characterized by freezing the weights of the nodes in shared body 214 (illustrated as a dark infill with white dots within the nodes). To perform the first training procedure, the second inference generation path may be trained. The portions of multipath neural network 210 trained during the first training procedure are illustrated by a dotted black infill on white background in both shared body 214 and bias feature head 218). Completion of the first training procedure may provide a revised second inference generation path in which the bias feature is predicted with high confidence from the revised second inference generation path.

Turning to FIG. 4B, a diagram illustrates an untraining procedure for the second inference generation path of multipath neural network 210 in accordance with an embodiment is shown. The untraining procedure may set weights second inference generation path such that the second inference generation path is less able to predict bias features. The untraining procedure may be performed to remove influence of the bias feature on shared body 214. In contrast to FIG. 4A, the weights of shared body 214 that were frozen during the first training procedure may be unfrozen (e.g., graphically illustrated in FIG. 2B by the circular elements representing the nodes being filled with solid white infill) to allow for the values of the weights to change. Completion of this untraining procedure may provide a shared body 214 that includes reduced levels of latent bias for the bias feature. By doing so, the untraining procedure may cause the bias feature to be predicted with reduced confidence.

Turning to FIG. 4C, a diagram illustrates a second training procedure for the first inference generation path of multipath neural network 210 in accordance with an embodiment is shown. The second training procedure may set weights for the first inference generation path such that the first inference generation path is better able to predict desired features (e.g., labels for which an original inference model was trained to infer). Similar to the first training procedure, weights of the nodes of shared body 214 (illustrated as a dark infill with white dots within the nodes) may be frozen while weights of label prediction head 216 may be unfrozen during second training procedure. To perform the second training procedure, the first inference generation path may be trained (illustrated by black dotted infill on white background in both shared body 214 and label prediction head 216). Completion of this second training procedure may provide an unbiased inference model (e.g., or at one that includes reduced levels of latent bias, the unbiased inference model may be based on the first inference generation path) for the bank to use.

Thus, as illustrated in FIGS. 4A-4C, embodiments disclosed herein may facilitate reduction and/or remove of latent bias in inference models used to provide computer-implemented services. Thus, the provided computer-implemented services may be provided in a manner that is more likely to meet expectations of consumers of the services.

Figure 5:
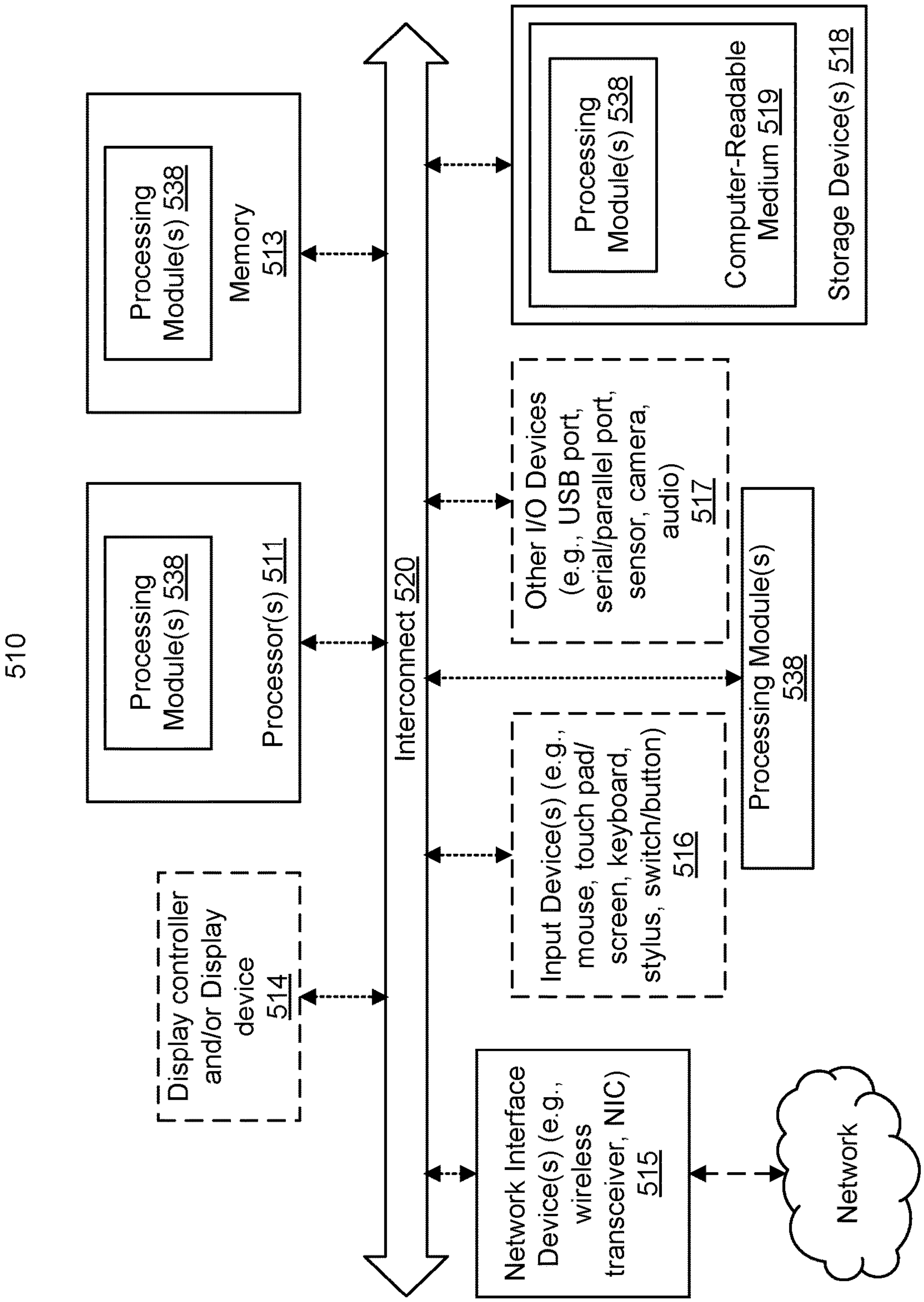
FIG. 5 shows a block diagram illustrating a data processing system in accordance with an embodiment.

Any of the components illustrated in FIG. 1 may be implemented with one or more computing devices. Turning to FIG. 5, a block diagram illustrating an example of a data processing system (e.g., a computing device) in accordance with an embodiment is shown. For example, system 510 may represent any of data processing systems described above performing any of the processes or methods described above. System 510 can include many different components. These components can be implemented as integrated circuits (ICs), portions thereof, discrete electronic devices, or other modules adapted to a circuit board such as a motherboard or add-in card of the computer system, or as components otherwise incorporated within a chassis of the computer system. Note also that system 510 is intended to show a high-level view of many components of the computer system. However, it is to be understood that additional components may be present in certain implementations and furthermore, different arrangement of the components shown may occur in other implementations. System 510 may represent a desktop, a laptop, a tablet, a server, a mobile phone, a media player, a personal digital assistant (PDA), a personal communicator, a gaming device, a network router or hub, a wireless access point (AP) or repeater, a set-top box, or a combination thereof. Further, while only a single machine or system is illustrated, the term "machine" or "system" shall also be taken to include any collection of machines or systems that individually or jointly execute a set (or multiple sets) of instructions to perform any one or more of the methodologies discussed herein.

In one embodiment, system 510 includes processor 511, memory 513, and devices 515-517 via a bus or an interconnect 520. Processor 511 may represent a single processor or multiple processors with a single processor core or multiple processor cores included therein. Processor 511 may represent one or more general-purpose processors such as a microprocessor, a central processing unit (CPU), or the like. More particularly, processor 511 may be a complex instruction set computing (CISC) microprocessor, reduced instruction set computing (RISC) microprocessor, very long instruction word (VLIW) microprocessor, or processor implementing other instruction sets, or processors implementing a combination of instruction sets. Processor 511 may also be one or more special-purpose processors such as an application specific integrated circuit (ASIC), a cellular or baseband processor, a field programmable gate array (FPGA), a digital signal processor (DSP), a network processor, a graphics processor, a network processor, a communications processor, a cryptographic processor, a co-processor, an embedded processor, or any other type of logic capable of processing instructions.

Processor 511, which may be a low power multi-core processor socket such as an ultra-low voltage processor, may act as a main processing unit and central hub for communication with the various components of the system. Such processor can be implemented as a system on chip (SoC). Processor 511 is configured to execute instructions for performing the operations discussed herein. System 510 may further include a graphics interface that communicates with optional graphics subsystem 514, which may include a display controller, a graphics processor, and/or a display device.

Processor 511 may communicate with memory 513, which in one embodiment can be implemented via multiple memory devices to provide for a given amount of system memory. Memory 513 may include one or more volatile storage (or memory) devices such as random-access memory (RAM), dynamic RAM (DRAM), synchronous DRAM (SDRAM), static RAM (SRAM), or other types of storage devices. Memory 513 may store information including sequences of instructions that are executed by processor 511, or any other device. For example, executable code and/or data of a variety of operating systems, device drivers, firmware (e.g., input output basic system or BIOS), and/or applications can be loaded in memory 513 and executed by processor 511. An operating system can be any kind of operating systems, such as, for example, Windows® operating system from Microsoft®, Mac OS®/iOS® from Apple, Android® from Google®, Linux®, Unix®, or other real-time or embedded operating systems such as VxWorks.

System 510 may further include IO devices such as devices (e.g., 515, 515, 517, 518) including network interface device(s) 515, optional input device(s) 515, and other optional IO device(s) 517. Network interface device(s) 515 may include a wireless transceiver and/or a network interface card (NIC). The wireless transceiver may be a WiFi transceiver, an infrared transceiver, a Bluetooth transceiver, a WiMax transceiver, a wireless cellular telephony transceiver, a satellite transceiver (e.g., a global positioning system (GPS) transceiver), or other radio frequency (RF) transceivers, or a combination thereof. The NIC may be an Ethernet card.

Input device(s) 515 may include a mouse, a touch pad, a touch sensitive screen (which may be integrated with a display device of optional graphics subsystem 514), a pointer device such as a stylus, and/or a keyboard (e.g., physical keyboard or a virtual keyboard displayed as part of a touch sensitive screen). For example, input device(s) 515 may include a touch screen controller coupled to a touch screen. The touch screen and touch screen controller can, for example, detect contact and movement or break thereof using any of a plurality of touch sensitivity technologies, including but not limited to capacitive, resistive, infrared, and surface acoustic wave technologies, as well as other proximity data collector arrays or other elements for determining one or more points of contact with the touch screen.

IO devices 517 may include an audio device. An audio device may include a speaker and/or a microphone to facilitate voice-enabled functions, such as voice recognition, voice replication, digital recording, and/or telephony functions. Other IO devices 517 may further include universal serial bus (USB) port(s), parallel port(s), serial port(s), a printer, a network interface, a bus bridge (e.g., a PCI-PCI bridge), data collector(s) (e.g., a motion data collector such as an accelerometer, gyroscope, a magnetometer, a light data collector, compass, a proximity data collector, etc.), or a combination thereof. IO device(s) 517 may further include an imaging processing subsystem (e.g., a camera), which may include an optical data collector, such as a charged coupled device (CCD) or a complementary metal-oxide semiconductor (CMOS) optical data collector, utilized to facilitate camera functions, such as recording photographs and video clips. Certain data collectors may be coupled to interconnect 520 via a data collector hub (not shown), while other devices such as a keyboard or thermal data collector may be controlled by an embedded controller (not shown), dependent upon the specific configuration or design of system 510.

To provide for persistent storage of information such as data, applications, one or more operating systems and so forth, a mass storage (not shown) may also couple to processor 511. In various embodiments, to enable a thinner and lighter system design as well as to improve system responsiveness, this mass storage may be implemented via a solid-state device (SSD). However, in other embodiments, the mass storage may primarily be implemented using a hard disk drive (HDD) with a smaller amount of SSD storage to act as an SSD cache to enable non-volatile storage of context state and other such information during power down events so that a fast power up can occur on re-initiation of system activities. Also, a flash device may be coupled to processor 511, e.g., via a serial peripheral interface (SPI). This flash device may provide for non-volatile storage of system software, including a basic input/output software (BIOS) as well as other firmware of the system.

Storage device 518 may include computer-readable storage medium 519 (also known as a machine-readable storage medium or a computer-readable medium) on which is stored one or more sets of instructions or software (e.g., processing module, unit, and/or processing module/unit/logic 538) embodying any one or more of the methodologies or functions described herein. Processing module/unit/logic 538 may represent any of the components described above. Processing module/unit/logic 538 may also reside, completely or at least partially, within memory 513 and/or within processor 511 during execution thereof by system 510, memory 513 and processor 511 also constituting machine-accessible storage media. Processing module/unit/logic 538 may further be transmitted or received over a network via network interface device(s) 515.

Computer-readable storage medium 519 may also be used to store some software functionalities described above persistently. While computer-readable storage medium 519 is shown in an exemplary embodiment to be a single medium, the term "computer-readable storage medium" should be taken to include a single medium or multiple media (e.g., a centralized or distributed database, and/or associated caches and servers) that store the one or more sets of instructions. The terms "computer-readable storage medium" shall also be taken to include any medium that is capable of storing or encoding a set of instructions for execution by the machine and that cause the machine to perform any one or more of the methodologies of embodiments disclosed herein. The term "computer-readable storage medium" shall accordingly be taken to include, but not be limited to, solid-state memories, and optical and magnetic media, or any other non-transitory machine-readable medium.

Processing module/unit/logic 538, components and other features described herein can be implemented as discrete hardware components or integrated in the functionality of hardware components such as ASICS, FPGAs, DSPs or similar devices. In addition, processing module/unit/logic 538 can be implemented as firmware or functional circuitry within hardware devices. Further, processing module/unit/logic 538 can be implemented in any combination hardware devices and software components.

Note that while system 510 is illustrated with various components of a data processing system, it is not intended to represent any particular architecture or manner of interconnecting the components as such details are not germane to embodiments disclosed herein. It will also be appreciated that network computers, handheld computers, mobile phones, servers, and/or other data processing systems which have fewer components, or perhaps more components may also be used with embodiments disclosed herein.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as those set forth in the claims below, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Embodiments disclosed herein also relate to an apparatus for performing the operations herein. Such a computer program is stored in a non-transitory computer readable medium. A non-transitory machine-readable medium includes any mechanism for storing information in a form readable by a machine (e.g., a computer). For example, a machine-readable (e.g., computer-readable) medium includes a machine (e.g., a computer) readable storage medium (e.g., read only memory ("ROM"), random access memory ("RAM"), magnetic disk storage media, optical storage media, flash memory devices).

The processes or methods depicted in the preceding figures may be performed by processing logic that comprises hardware (e.g., circuitry, dedicated logic, etc.), software (e.g., embodied on a non-transitory computer readable medium), or a combination of both. Although the processes or methods are described above in terms of some sequential operations, it should be appreciated that some of the operations described may be performed in a different order. Moreover, some operations may be performed in parallel rather than sequentially.

Embodiments disclosed herein are not described with reference to any particular programming language. It will be appreciated that a variety of programming languages may be used to implement the teachings of embodiments disclosed herein.

In the foregoing specification, embodiments have been described with reference to specific exemplary embodiments thereof. It will be evident that various modifications may be made thereto without departing from the broader spirit and scope of the embodiments disclosed herein as set forth in the following claims. The specification and drawings are, accordingly, to be regarded in an illustrative sense rather than a restrictive sense.

What is claimed is:

1. A method for managing an inference model that may exhibit latent bias and is trained using a first training data set, the method comprising:

- obtaining a test data set, the test data set comprising at least a portion of the first training data set;
- performing a gradient analysis of the inference model using the test data set to obtain a latent bias score for the test data set, the latent bias score indicating a relationship between input features of the test data set and an ability of the inference model to predict a bias feature;
- making a determination regarding whether the latent bias score exceeds a latent bias score threshold;
- in an instance of the determination in which the latent bias score exceeds the latent bias score threshold:
  - removing the input features of the test data set from the first training data set to obtain an updated training data set; and
  - obtaining a new inference model using the updated training data set to replace the inference model,
- wherein the inference model comprises:
  - a first inference generation path comprising a shared body portion and a first head portion; and
  - a second inference generation path comprising the shared body portion and a second head portion.

2. The method of claim 1, wherein obtaining the test data set comprises:

- obtaining the first training data set, the first training data set comprising a listing of entries;
- for each entry of the listing of the entries:
  - obtaining an input, an output, and a bias feature label;
  - obtaining a subset of the input features associated with the input;
  - obtaining a new entry for the test data set, the new entry comprising:
    - an input comprising the subset of the input features;

the output; and
the bias feature label; and
adding the new entry to the test data set.

3. The method of claim 2, wherein performing the gradient analysis comprises:
obtaining a listing of partial latent bias scores; and
aggregating the partial latent bias scores of the listing of partial latent bias scores to obtain the latent bias score.

4. The method of claim 3, wherein obtaining the listing of partial latent bias scores comprises:
for each entry of the test data set:
obtaining a first gradient, the first gradient indicating a relationship between the input and the ability of the inference model to predict the output;
obtaining a second gradient, the second gradient indicating a relationship between the input and the ability of the inference model to predict the bias feature label;
obtaining a first partial latent bias score using the first gradient and the second gradient; and
adding the first partial latent bias score to the listing of partial latent bias scores.

5. The method of claim 4, wherein a negative first gradient with a larger magnitude indicates a stronger relationship between the input and the ability of the inference model to faithfully predict the output.

6. The method of claim 5, wherein a negative second gradient with a larger magnitude indicates a stronger relationship between the input and the ability of the inference model to faithfully predict the bias feature.

7. The method of claim 6, wherein the latent bias score threshold is exceeded when the latent bias score is negative and has a magnitude that exceeds a magnitude indicated by the latent bias score threshold.

8. The method of claim 1, wherein the first inference generation path is trained to generate inferences to predict an output and the second inference generation path is trained to generate inferences to predict the bias feature.

9. A non-transitory machine-readable medium having instructions stored therein, which when executed by a processor, cause the processor to perform operations for managing an inference model that may exhibit latent bias and is trained using a first training data set, the operations comprising:
obtaining a test data set, the test data set comprising at least a portion of the first training data set;
performing a gradient analysis of the inference model using the test data set to obtain a latent bias score for the test data set, the latent bias score indicating a relationship between input features of the test data set and an ability of the inference model to predict a bias feature;
making a determination regarding whether the latent bias score exceeds a latent bias score threshold;
in an instance of the determination in which the latent bias score exceeds the latent bias score threshold:
removing the input features of the test data set from the first training data set to obtain an updated training data set; and
obtaining a new inference model using the updated training data set to replace the inference model,
wherein the inference model comprises:
a first inference generation path comprising a shared body portion and a first head portion; and
a second inference generation path comprising the shared body portion and a second head portion.

10. The non-transitory machine-readable medium of claim 9, wherein obtaining the test data set comprises:
obtaining the first training data set, the first training data set comprising a listing of entries;
for each entry of the listing of the entries:
obtaining an input, an output, and a bias feature label;
obtaining a subset of the input features associated with the input;
obtaining a new entry for the test data set, the new entry comprising:
an input comprising the subset of the input features;
the output; and
the bias feature label; and
adding the new entry to the test data set.

11. The non-transitory machine-readable medium of claim 10, wherein performing the gradient analysis comprises:
obtaining a listing of partial latent bias scores; and
adding the partial latent bias scores of the listing of partial latent bias scores to obtain the latent bias score.

12. The non-transitory machine-readable medium of claim 11, wherein obtaining the listing of partial latent bias scores comprises:
for each entry of the test data set:
obtaining a first gradient, the first gradient indicating a relationship between the input and the ability of the inference model to predict the output;
obtaining a second gradient, the second gradient indicating a relationship between the input and the ability of the inference model to predict the bias feature label;
adding the first gradient and the second gradient to obtain a first partial latent bias score; and
adding the first partial latent bias score to the listing of partial latent bias scores.

13. The non-transitory machine-readable medium of claim 12, wherein a higher positive first gradient indicates a stronger relationship between the input and the ability of the inference model to faithfully predict the output.

14. The non-transitory machine-readable medium of claim 13, wherein a negative second gradient with a larger magnitude indicates a stronger relationship between the input and the ability of the inference model to faithfully predict the bias feature.

15. A data processing system, comprising:
a processor; and
a memory coupled to the processor to store instructions, which when executed by the processor, cause the processor to perform operations for managing an inference model that may exhibit latent bias and is trained using a first training data set, the operations comprising:
obtaining a test data set, the test data set comprising at least a portion of the first training data set;
performing a gradient analysis of the inference model using the test data set to obtain a latent bias score for the test data set, the latent bias score indicating a relationship between input features of the test data set and an ability of the inference model to predict a bias feature;
making a determination regarding whether the latent bias score exceeds a latent bias score threshold;
in an instance of the determination in which the latent bias score exceeds the latent bias score threshold:
removing the input features of the test data set from the first training data set to obtain an updated training data set; and obtaining a new inference model using the updated training data set to replace the inference model, wherein the inference model comprises:

a first inference generation path comprising a shared body portion and a first head portion; and a second inference generation path comprising the shared body portion and a second head portion.

16. The data processing system of claim 15, wherein obtaining the test data set comprises:

obtaining the first training data set, the first training data set comprising a listing of entries;

for each entry of the listing of the entries:

obtaining an input, an output, and a bias feature label;

obtaining a subset of the input features associated with the input;

obtaining a new entry for the test data set, the new entry comprising:

an input comprising the subset of the input features;

the output; and the bias feature label; and adding the new entry to the test data set.

17. The data processing system of claim 16, wherein performing the gradient analysis comprises:

obtaining a listing of partial latent bias scores; and adding the partial latent bias scores of the listing of partial latent bias scores to obtain the latent bias score.

18. The data processing system of claim 17, wherein obtaining the listing of partial latent bias scores comprises:

for each entry of the test data set:

obtaining a first gradient, the first gradient indicating a relationship between the input and the ability of the inference model to predict the output;

obtaining a second gradient, the second gradient indicating a relationship between the input and the ability of the inference model to predict the bias feature label;

adding the first gradient and the second gradient to obtain a first partial latent bias score; and adding the first partial latent bias score to the listing of partial latent bias scores.

19. The data processing system of claim 18, wherein a higher positive first gradient indicates a stronger relationship between the input and the ability of the inference model to faithfully predict the output.

20. The data processing system of claim 15, wherein the first inference generation path is trained to generate inferences to predict an output and the second inference generation path is trained to generate inferences to predict the bias feature.

* * * * *